United States Patent
Yamakose

(10) Patent No.: US 7,440,024 B2
(45) Date of Patent: Oct. 21, 2008

(54) IMAGING APPARATUS FOR OUTPUTTING ON AN EXTERNAL DISPLAY DEVICE AN IMAGE CAPTURED BY THE APPARATUS

(75) Inventor: Hiroshi Yamakose, Gifu-ken (JP)

(73) Assignee: Elmo Company, Limited (JP)

( * ) Notice: Subject to any disclaimer, the term of this patent is extended or adjusted under 35 U.S.C. 154(b) by 605 days.

(21) Appl. No.: 10/977,677

(22) Filed: Oct. 29, 2004

(65) Prior Publication Data

US 2005/0225667 A1 Oct. 13, 2005

(30) Foreign Application Priority Data

Apr. 13, 2004 (JP) ............................. 2004-117678

(51) Int. Cl.
*H04N 5/225* (2006.01)
(52) U.S. Cl. ...................... 348/373; 348/335
(58) Field of Classification Search ................ 348/373, 348/374, 375, 376, 335
See application file for complete search history.

(56) References Cited

U.S. PATENT DOCUMENTS 5,374,971 A * 12/1994 Clapp et al. ................ 354/293
5,757,430 A * 5/1998 Maeda et al. ............... 348/373
6,069,648 A * 5/2000 Suso et al. .................... 348/14
6,697,117 B1 * 2/2004 Park ........................... 348/373
2004/0090552 A1 * 5/2004 Watanabe et al. ........... 348/373

FOREIGN PATENT DOCUMENTS

JP 08-084294 3/1996

* cited by examiner

*Primary Examiner*—Tuan Ho
*Assistant Examiner*—Aleksei Austin
(74) *Attorney, Agent, or Firm*—Ostrolenk, Faber, Gerb & Soffen, LLP

(57) ABSTRACT

An imaging apparatus that outputs an image of an object taken by an imaging device to an external display device is disclosed. The imaging apparatus includes a main body, a lid serving as a leg to support the main body, and electronics devices such as a controller within the main body. The lid is rotatably engaged with one end of the main body. In a first configuration, the lid overlaps the main body, and in a second configuration the lid and the main body form a V-shape, such that one end of the lid is separated from the main body. In the second configuration, the main body stands tilted and is supported by the lid, such that they straddle a top surface of the object supporter such as desktop. The imaging unit may thus be pointed toward the object located in the straddled region.

10 Claims, 18 Drawing Sheets

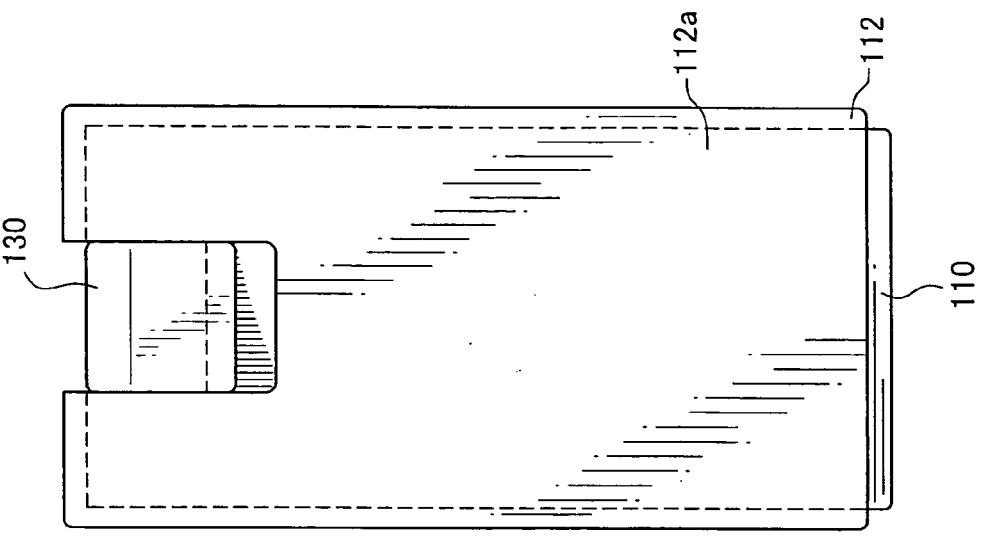
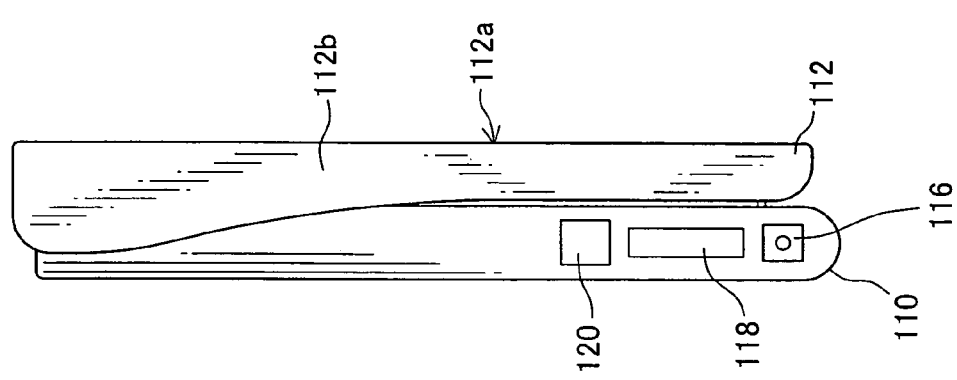
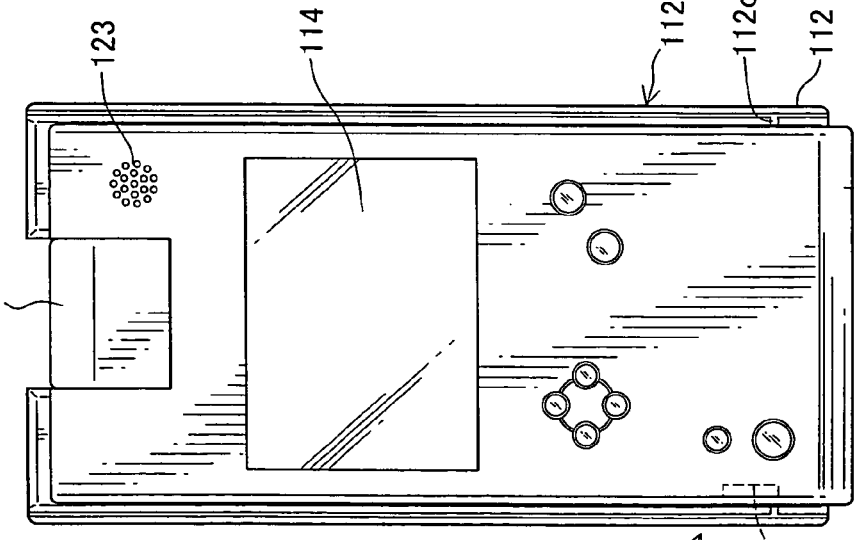

IMAGING APPARATUS FOR OUTPUTTING ON AN EXTERNAL DISPLAY DEVICE AN IMAGE CAPTURED BY THE APPARATUS

BACKGROUND OF THE INVENTION

The present invention relates to an imaging apparatus that includes an imaging device for imaging an object and outputs an image taken by the imaging device as an image signal to an external display device.

DESCRIPTION OF THE RELATED ART

Since such an imaging apparatus can display the image on a TV display etc, which has a large screen, a variety of imaging apparatuses have been proposed (e.g. JAPANESE PATENT LAID-OPEN GAZETTE No. 8-84294)

The imaging apparatus facilitates taking an image of an object such as photograph located on a top surface of a table and the like, but the main body of the apparatus must be lifted up by use of left and right arms when imaging the object in this manner. Since this makes the center of gravity of the apparatus relatively higher, the apparatus does not have good stability, and thus there is still room for improvement. In addition, the left and right arms must be opened, and therefore there is also room for improvement in handling.

Therefore, an object of the present invention is to improve usability of imaging apparatus that can output an image taken by an imaging device for imaging an object to an external display device.

SUMMARY OF THE INVENTION

In order to achieve the object, an imaging apparatus of the present invention includes a main body and a leg for supporting the main body, and further includes within the main body at least part of electronics devices used for image signal generation that enables an image taken by an imaging device to be output as an image signal to an external display device. The leg is attached to one end of the main body, and is capable of taking a first attitude and a second attitude, in the first attitude the leg overlapping the main body, in the second attitude the leg supporting the main body so that the main body has the other end in contact with a top surface of a object supporting base and is inclined relative to the top surface. The inclined main body and the leg in the second attitude form a straddle region where they straddle the object on the top surface of the object supporting base, and the imaging device is located on the end to which the leg is attached so that the imaging device is directed toward the object while the main body and the leg straddle the object.

Consequently, according to the imaging apparatus of the present invention, it is only required to incline the main body relative to the top surface of the supporting base for the object when taking an image of the object on the top surface of the object supporting base in the straddle region, and preventing the center of gravity of the apparatus from being carelessly elevated. Therefore, the imaging apparatus has good stability during imaging an object. Furthermore, when imaging an object, it is only required to bring the leg attached to the main body into the second attitude to support the main body inclined, and ensuring easy handling.

In the imaging apparatus of the present invention, the leg keeps a distance between the top surface of the object supporting base in the straddle region and the imaging device toward the object. This allows the imaging device to be a fixed-focus one. As a result, the apparatus can be simplified and thus reduced in size and weight, and thereby improving the portability.

In addition, the imaging apparatus may include a leg holding mechanism to attach the leg to the main body. When a user brings the leg from the first attitude to the second attitude, the leg holding mechanism gives a user a feeling of limit at the completion of the second attitude. This preferably enables the user to perceive through this feeling of limit that the leg has been brought into the second attitude.

Furthermore, the imaging device may be attached to the main body so that the imaging device is capable of taking an attitude where the imaging device is directed toward the object on the straddle region and an attitude where the imaging device is directed toward a region other than the straddle region. This improves the flexibility of imaging performed by the imaging device, and thereby providing a variety of applications.

The imaging apparatus may include an imaging device holding mechanism that directs the imaging device toward the object on the straddle region when the leg is brought from the first attitude to the second attitude. Consequently, changing the attitude of the leg leads to setting the direction of the imaging device. Therefore, when imaging the object on the straddle region, it is only required to change the attitude of the leg, and thereby facilitating the handling.

In addition, the leg may include a lighting window that lets light from the outside into the straddle region. This preferably lowers the possibility of shortage in amount of light during imaging the object.

Furthermore, the main body may include a display unit that displays an image taken by the imaging device based on an image signal generated by the electronics devices. This preferably enables the image taken by the imaging device to be viewed on the main body side.

When the display unit is included in the main body, the imaging apparatus may display the image on the display unit while outputs the image signal of the image to the external display device, or may selectively display the image on the display unit or on the external display device. According to this configuration, the imaging apparatus provides various ways of displaying images.

The main body may include an input device for inputting an image signal from an external image signal output device, and the imaging apparatus may selectively display on the display unit an image based on the image signal from the external image signal output device or an image taken by the imaging device. According to this configuration, the imaging apparatus also provides various ways of displaying images.

At least one of the main body and the leg may include an illumination device for illuminating the object on the straddle region, and thereby effectively compensating for shortage in amount of light on the straddle region covered by the leg and main body.

The main body may include a sound collecting device and a sound output device for outputting collected sound as a sound signal to an external sound output device. This enables the sound to be output along with the image, and therefore providing a variety of applications.

BRIEF DESCRIPTION OF THE DRAWINGS

FIG. 2 is a schematic diagram illustrating a front side, lateral side, and back side of the imaging apparatus 100 with its lid closed.

DESCRIPTION OF THE PREFERRED EMBODIMENT

Figure 1:
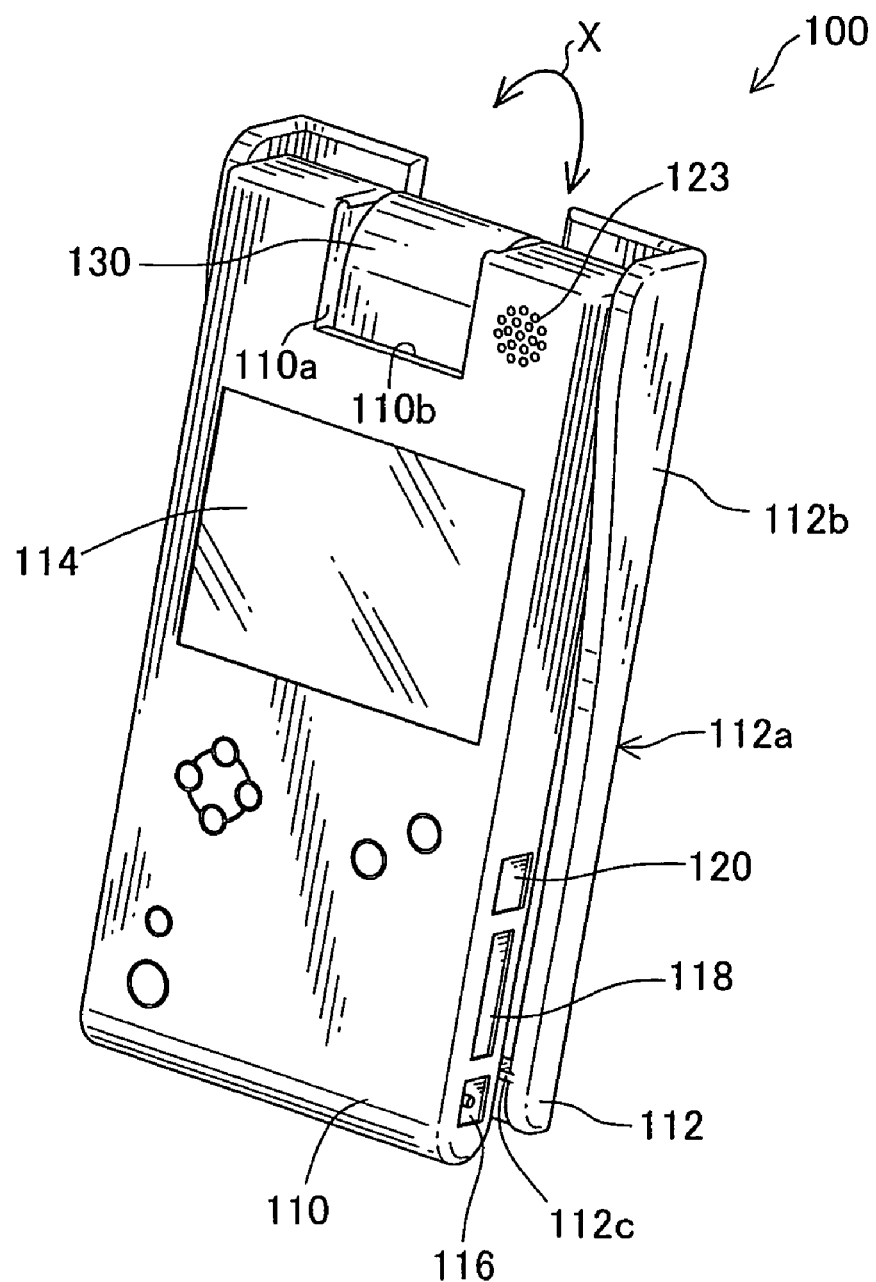
FIG. 1 is a perspective view schematically illustrating an imaging apparatus 100 according to a first embodiment with its lid closed.
Figure 3:
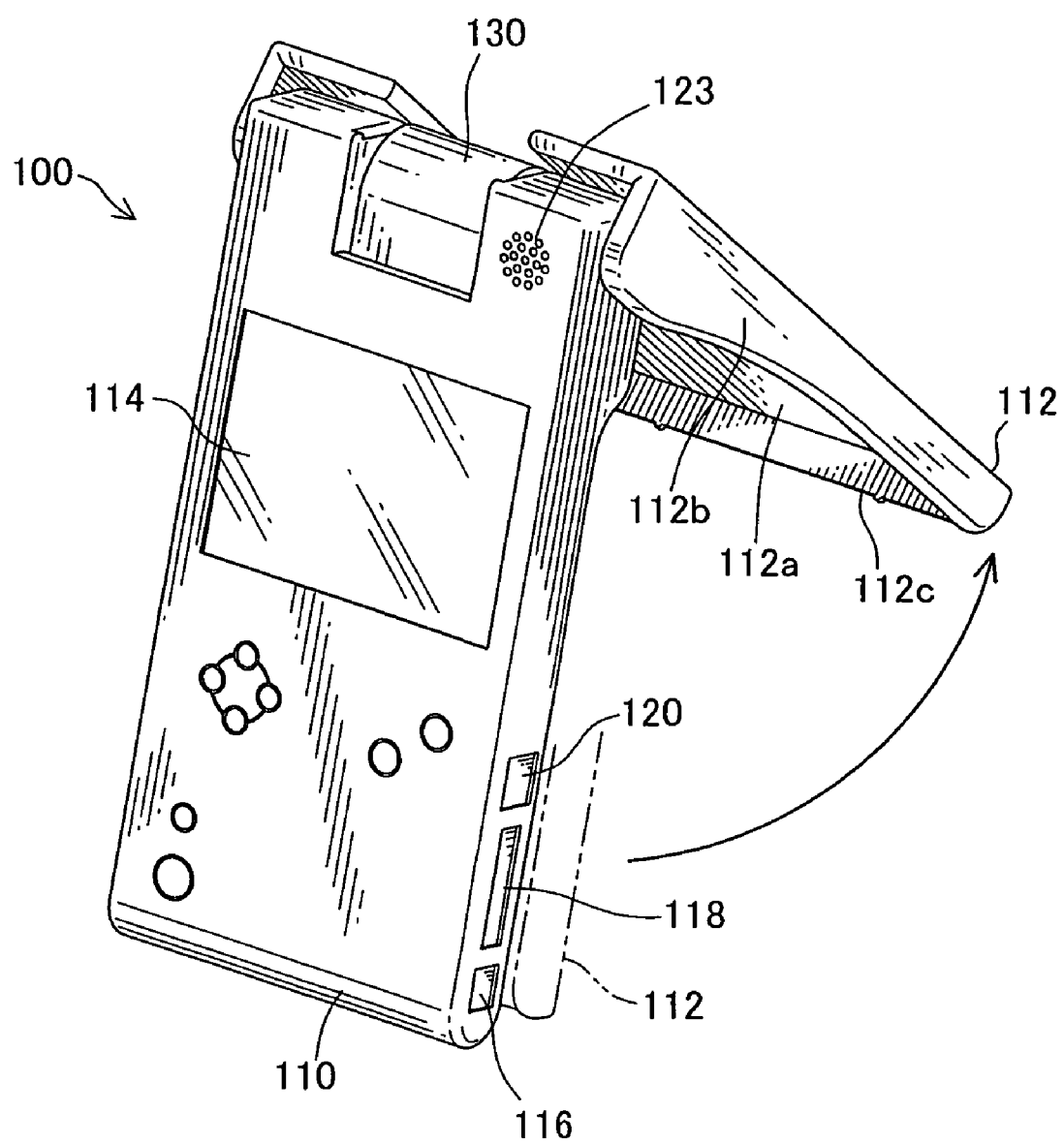
FIG. 3 is a perspective view illustrating the state of the imaging apparatus 100 when imaging an object on a desktop.
Figure 4:
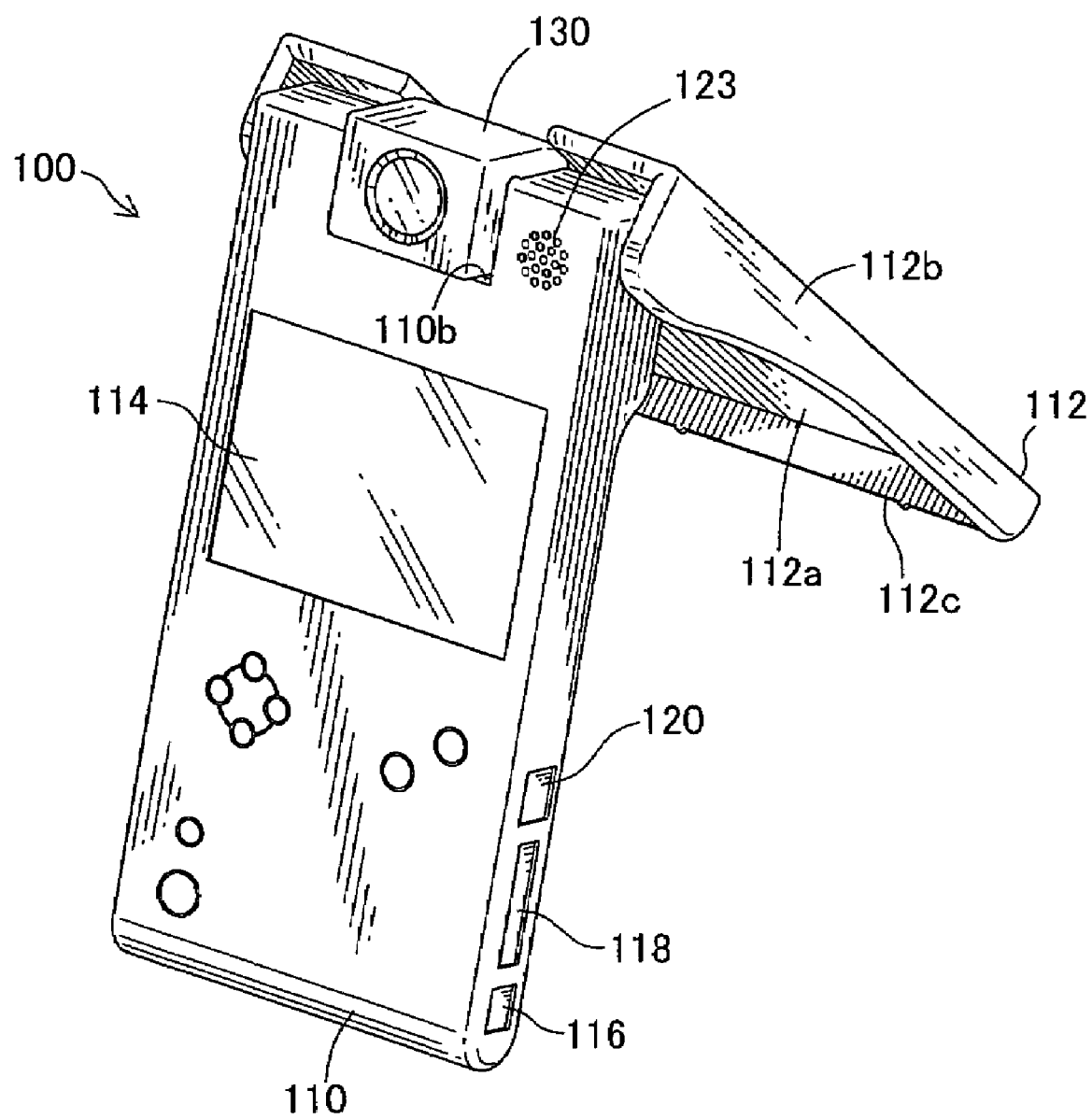
FIG. 4 is a perspective view illustrating the state of the imaging apparatus 100 when imaging surroundings.

The following describes embodiments of the present invention. FIG. 1 is a perspective view schematically illustrating an imaging apparatus 100 according to a first embodiment with its lid closed; FIG. 2 is a schematic diagram illustrating a front side, lateral side, and back side of the imaging apparatus 100 with its lid closed; FIG. 3 is a perspective view illustrating the state of the imaging apparatus 100 when imaging an object on a desktop; and FIG. 4 is a perspective view illustrating the state of the imaging apparatus 100 when imaging surroundings.

As shown in FIG. 1, the imaging apparatus 100 has portability, which is as large as a datebook, and includes a lid body 112 attached to a main body 110. The main body 110 is a hollow casing, and includes electronics devices described later embedded therein, and a liquid crystal display panel 114 and a variety of buttons on the side that is not covered by the lid body 112. The main body 110 also includes on one lateral side a power supply connector 116, a slot 118 for memory device, an output connector 120 (e.g. optical connector, coaxial cable connector, and USB (Universal Serial Bus)) for outputting signals to the outside, and on the other lateral side a video input terminal 122 for inputting video and image signals from external video and image devices such as video camera and personal computer. In this embodiment, the main body 110 further includes a sound collecting microphone 123. For convenience of explanation, both the video signal of moving image and the image signal of still image are referred to as image signal.

The lid body 112 is engaged with one end (i.e. upper end) of the main body 110 in a longitudinal direction, and serves as a leg that supports the main body 110 when imaging the object. The lid body 112 is opened and closed around the engagement axis with the main body, and may take a first attitude (see FIG. 1) where the lid body 112 overlaps the main body 110 or a second attitude where the lid body 112 and the main body 110 make a V-shape with one end of the lid body 112 separated from the main body 110. Since the lid body 112 in the second attitude makes a V-shape along with the main body 110, for example on an object supporting base such as desktop it supports the main body 110 that is inclined relative to the desktop with its end (bottom end of the main body) contacting the desktop.

As shown, the lid body 112 has a lid part 112a that has the form of plate and covers the main body 110, flap parts 112b that are hung from both sides of the lid part 112, and a bridge part 112c on the backside of the lid part 112a (i.e. on the side toward the main body). As shown in FIG. 1, the lid part 112a serves as a bottom face member of the entire imaging apparatus 100 when it overlaps the main body 110. The flap part 112b has the functions of reinforcing the lid body 112 and covering the lateral sides of the main body, and keeps the power supply connector 116 and the like exposed even if the lid body 112 is in the first attitude (see FIG. 1). The bridge part 112c comes into contact with the backside of the main body 110 when the lid body 112 is in the first attitude (see FIG. 1) so that the lid part 112a of the lid body 112 in the first attitude is substantially parallel to the main body 110. Consequently, when the lid body 112 is in the first attitude (see FIG. 1), the imaging apparatus 100 may be used in a manner that it is put on the desktop and the like with the liquid crystal display panel 114 up, and allows the image signal to be input via the video input terminal 122 from the external image device such as video camera and personal computer, the image signal and audio signal to be output via the output connector 120, and the memory to be inserted to the slot 118. In such form of usage, the imaging apparatus 100 may display the image on the liquid crystal display panel 114 based on the image signal input via the video input terminal 122 or the image signal stored on the memory. Alternatively, these signals may pass through the imaging apparatus 100 to be output to an external display device such as monitor.

Figure 5:
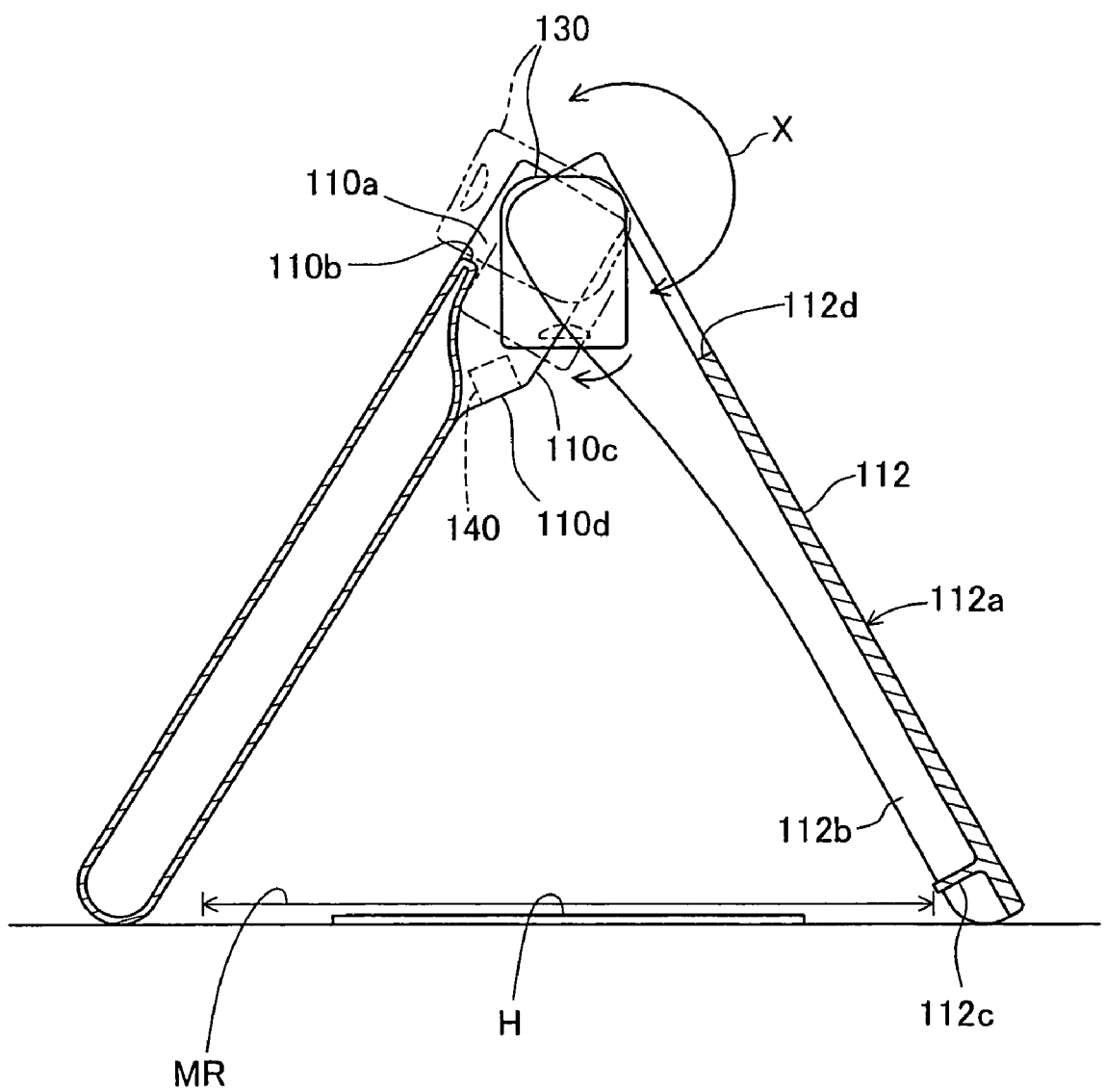
FIG. 5 is a schematic diagram illustrating potential positions which an imaging unit 130 may take.

The main body 110 includes an imaging unit 130 on its end to which the lid body 112 is attached. FIG. 5 is a schematic diagram illustrating potential positions which the imaging unit 130 may take. The imaging unit 130 includes therein imaging devices such as CCD imaging device and a set of lens, and is attached to two-forked portion in the center of the end of the main body 110 to which the lid body 112 is attached. The imaging unit 130 is rotatable in the direction of the arrow X shown in FIGS. 1 and 5. The lid body 112 has a cutout 112d in the center of the upper end of the lid part 112a in order to prevent interference with the rotational path of the imaging unit 130.

In the imaging apparatus 100 having such a configuration, the lid body 112 taking the second attitude relative to the main body 110 as shown in FIG. 3 results in the V-shape of the inclined main body 100 and lid body 112 to form a straddle region MR where the imaging apparatus 100 straddles the object on the top surface of the object supporting base such as desk as shown in FIG. 5. The imaging apparatus 100 directs its imaging unit 130 toward the object H with straddling the object H located on the straddle region MR, and may display the image of the object taken by the imaging unit 130 on the liquid crystal display panel 114 or in addition to this display output the signal of the image via the output connector 120 to an external display device such as monitor. Alternatively, it may selectively display the image on the liquid crystal display panel 114 or on the external display device. In addition, even if the imaging apparatus takes the above attitude for imaging the object, it may display the image on the liquid crystal display panel 114 based on the image signal input via the video input terminal 122 from an external image device or the image signal stored on the memory inserted into the slot 118. These signals may pass through the imaging apparatus 100 to be output to an external display device such as monitor. Since the imaging apparatus 100 that directs the imaging unit 130 toward the object H on the straddle region MR is frequently used to display the image of the object H, the attitude shown by the solid line in FIG. 5 is hereinafter referred to as object imaging attitude for the sake of convenience.

When the user rotates the imaging unit 130 to a position shown by the chain double-dashed line in FIG. 5, the imaging apparatus 100 supports the imaging unit 130 with a jaw 110b of an imaging unit housing cutout 110a in the center of the upper end of the main body 110. The imaging apparatus 100 brings the imaging unit 130 into this attitude so that it takes an image of a view in front of the main body 110 and displays the image on the liquid crystal display panel 114 or external display device as described above. In this case, the imaging apparatus 100 is frequently used to send images via Internet, and therefore the attitude shown by the chain double-dashed line in FIG. 5 and by the solid line in FIG. 4 is hereinafter referred to as web camera attitude for the sake of convenience.

Figure 6:
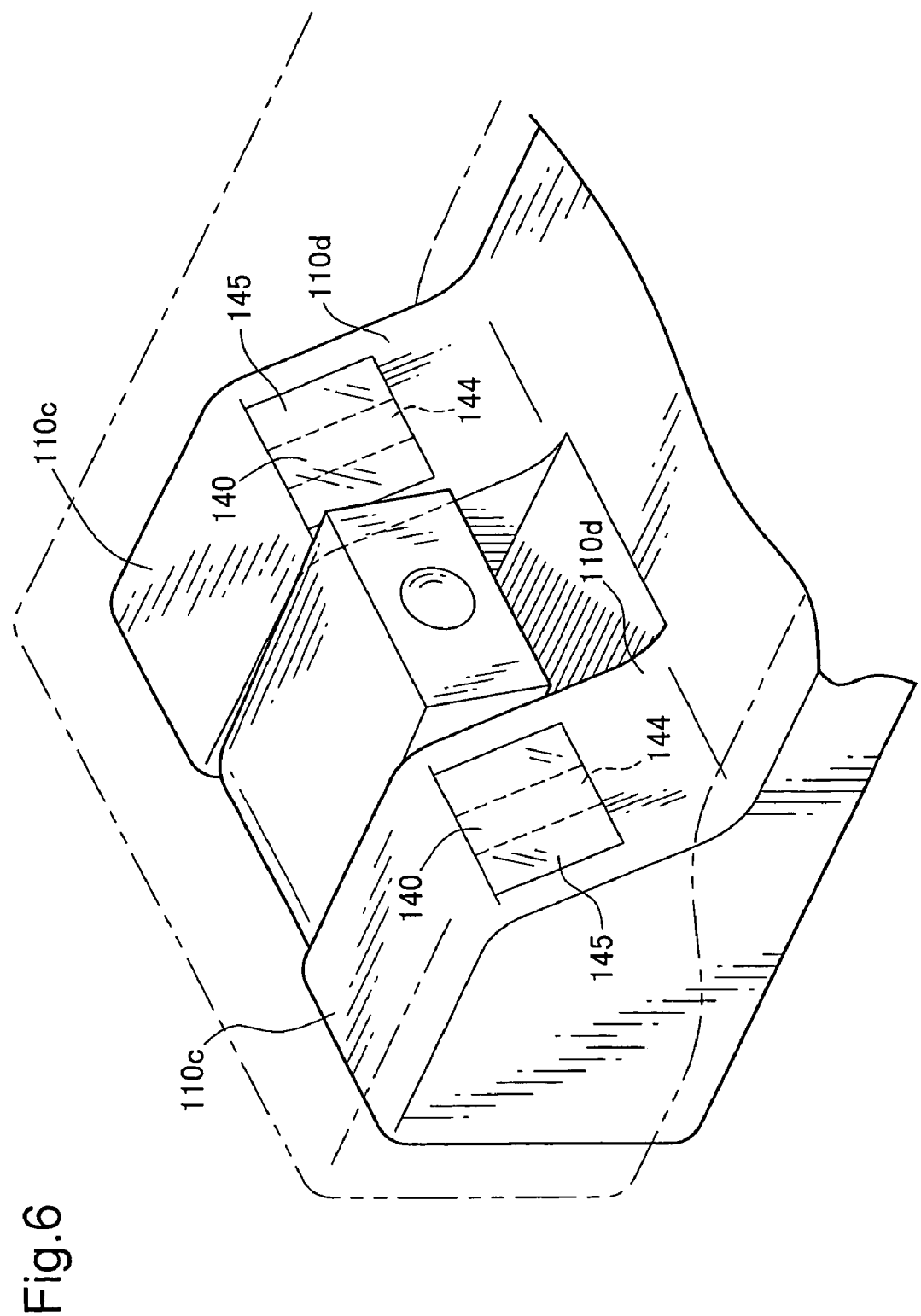
FIG. 6 is a schematic diagram illustrating illumination units attached.
Figure 7:
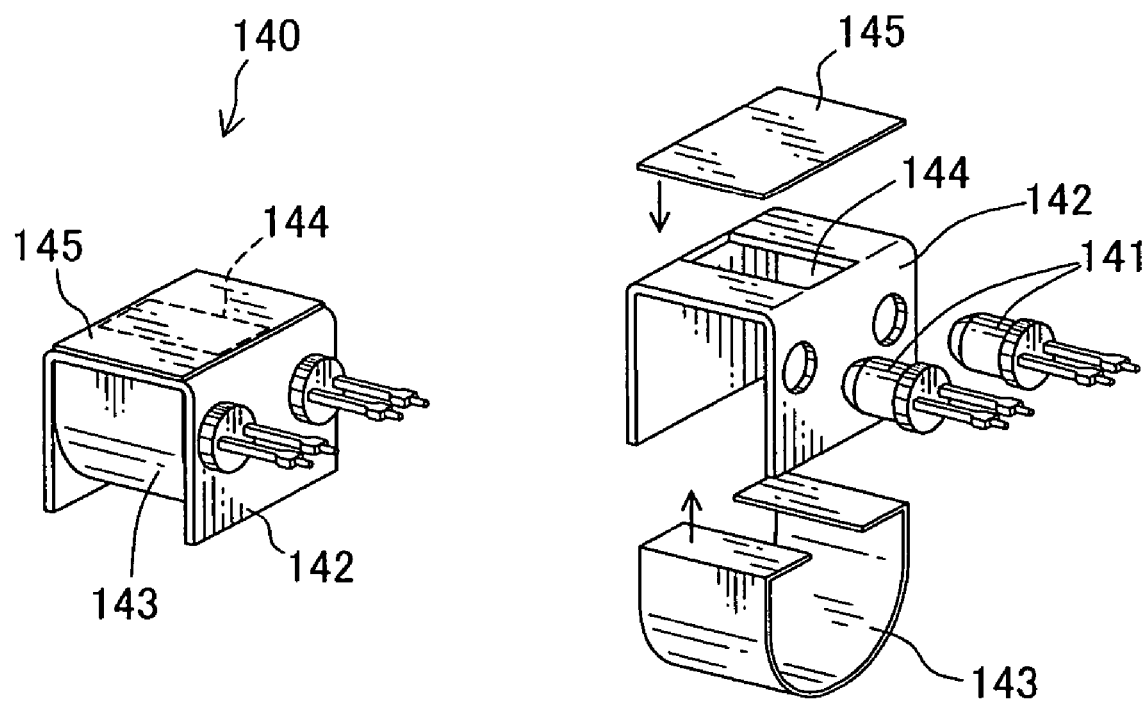
FIG. 7 is a schematic diagram illustrating an exploded view and completed view of the illumination unit 140.

The following describes illumination units of the imaging apparatus 100. FIG. 6 is a schematic diagram illustrating the illumination units attached; and FIG. 7 is a schematic diagram illustrating an exploded view and completed view of the illumination unit 140.

As shown in FIG. 6, the imaging apparatus 100 has the illumination units 140 in slopes 110d of prominent portions 110c on either side of the imaging unit 130 attached to the main body 110. As shown in FIG. 7, the illumination unit 140 includes two LED 141 as light sources attached to a holder 142 that is bent in a bridge-shape. A curved light reflector 143 is fixedly embedded within an opening of the holder 142, and collects the light of LED 141 toward a transparent window 144 of the holder 142. The illumination unit 140 includes a light diffusion plate 145 covering the transparent window 144, and is embedded in the main body 110 so that the light diffusion plate 145 is exposed on the slope 110d.

When the imaging apparatus 100 (lid body 112) takes the object imaging attitude described above, the slopes 110d are configured to obliquely face to the object H on the straddle region MR (see FIG. 5), and therefore the illumination units 140 illuminate the object H obliquely from above. The lid body 112 has the function of light diffusion on the backside of the lid part 112a which faces to the main body 110, and therefore the object H is also illuminated by light (i.e. diffused light) reflected on the backside of the lid part 112a.

Figure 8:
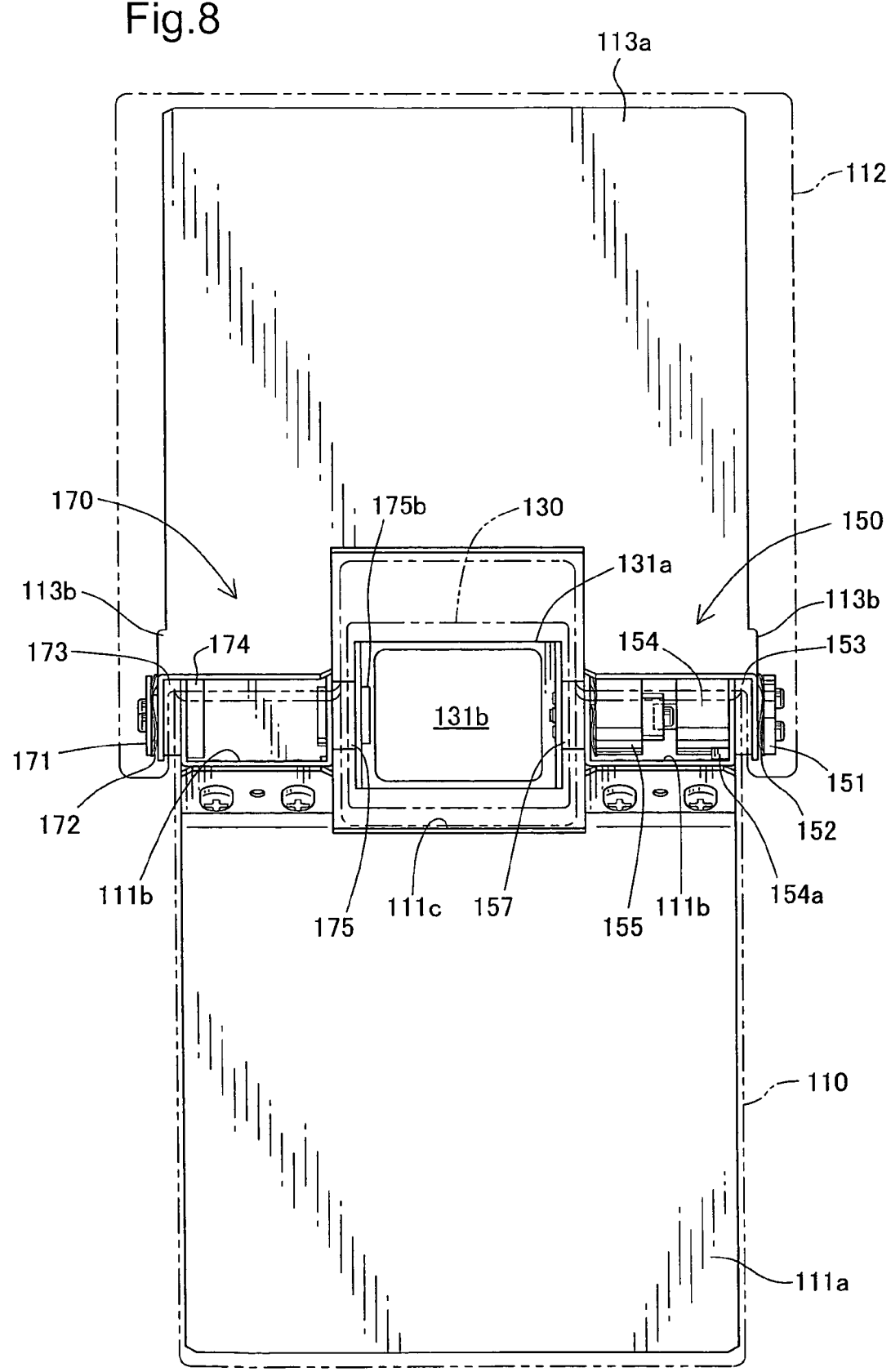
FIG. 8 is a schematic diagram illustrating a top perspective view of a drive and holding mechanism when a lid body 112 takes object imaging attitude shown in FIG. 3.
Figure 9:
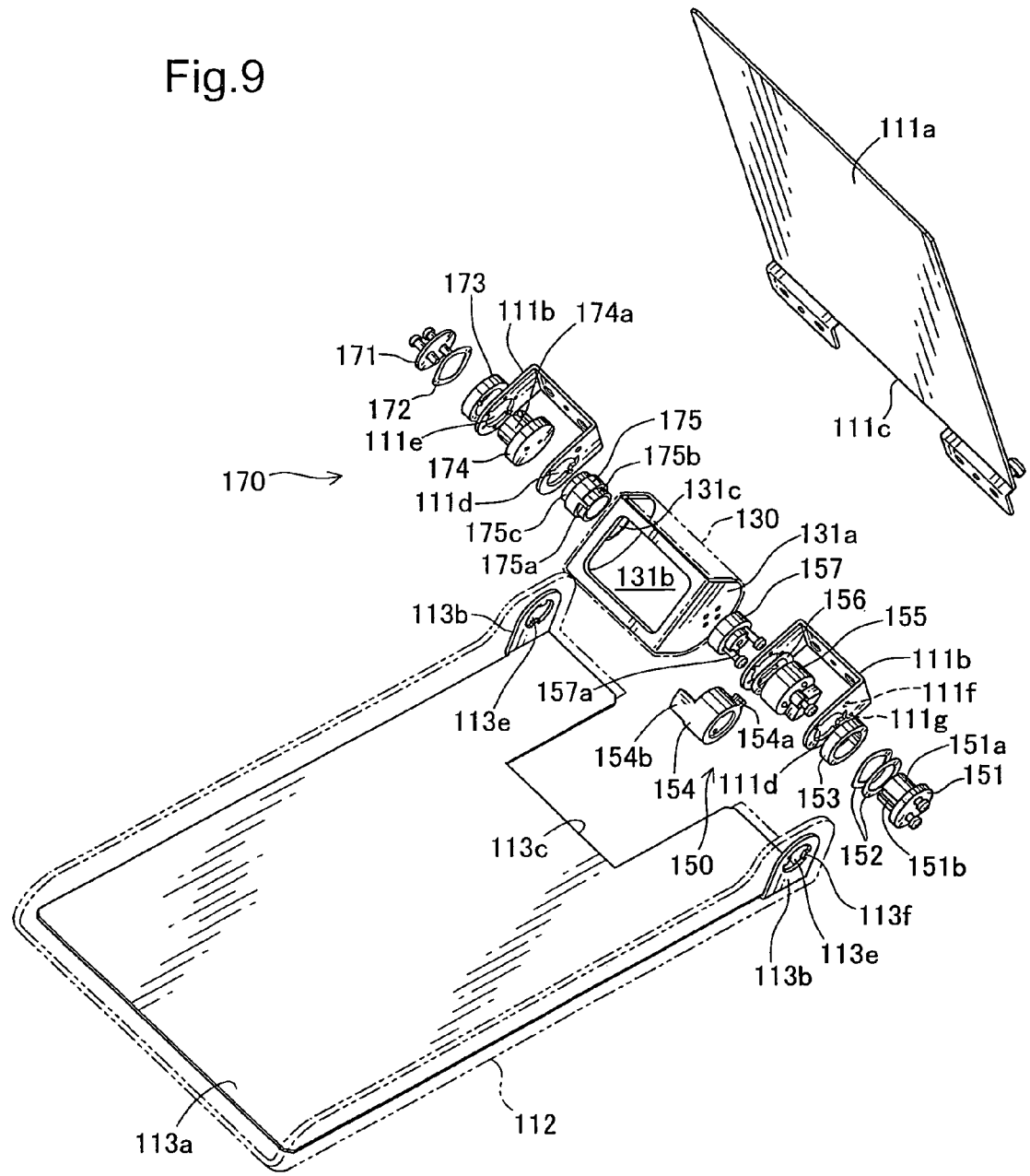
FIG. 9 is a schematic diagram illustrating an exploded view of the drive and holding mechanism in the object imaging attitude.

The following describes a drive and holding mechanism for the lid body 112 and imaging unit 130. FIG. 8 is a schematic diagram illustrating a top perspective view of the drive and holding mechanism when the lid body 112 takes object imaging attitude shown in FIG. 3; and FIG. 9 is a schematic diagram illustrating an exploded view of the drive and holding mechanism in the object imaging attitude.

The main body 110, lid body 112, and imaging unit 130 include a plastic outer envelope, and a thin steel plate as a frame within the outer envelope. As shown, the main body 110 includes a plate 111a as a main fame and bridges 111b bent in a bridge-shape that are screwed on either side of one end of the main body 110. The plate 111a includes a cutout 111c that corresponds to the imaging unit housing cutout 110a of the main body 110. The bridges 111b are embedded in the prominent portion 110c of the main body 110 described above to serve as a frame for the engagement of the lid body 112 with the main body 110 and for the rotation of the imaging unit 130.

The lid body 112 includes a plate 113a as a main frame, and holding pieces 113b for the engagement with the bridges 111b of the main body 110 on either side of one end of the lid body 112. The holding pieces 113b are formed by bending. The plate 113a has a cutout 113c that corresponds to the cutout 112d of the lid body 112 in the center of the end where the holding pieces 113b are located.

The imaging unit 130 includes a bridge 131a bent in a bridge-shape as a frame, and imaging devices such as CCD imaging device and a set of lens within the bridge. The bridge 131a has a window 131b for directing the lens and CCD imaging device toward an imaging target.

Figure 10:
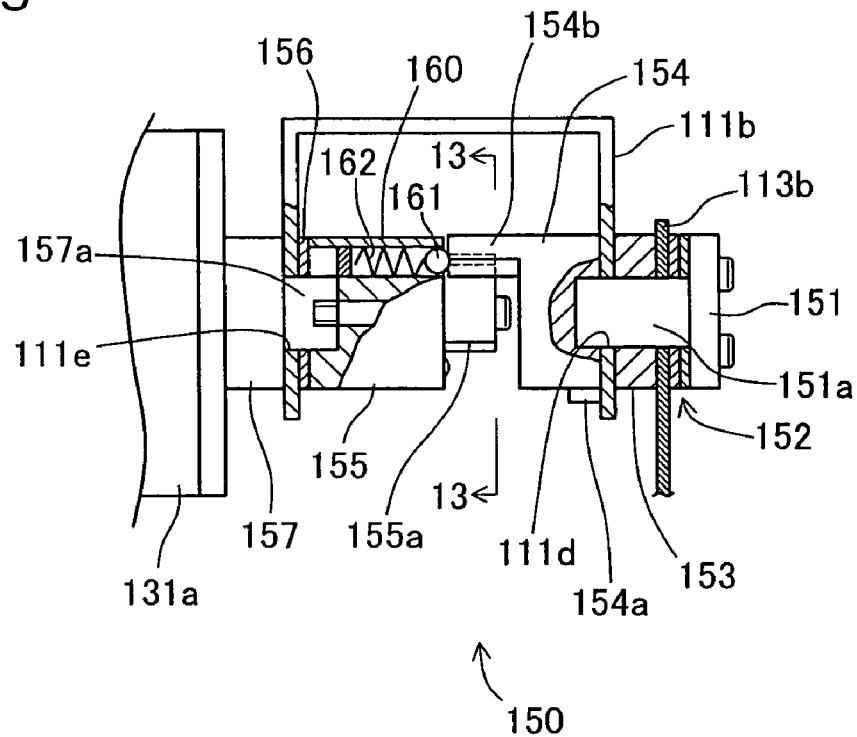
FIG. 10 is a schematic diagram illustrating the main drive and holding mechanism shown on the right of FIG. 9.
Figure 11:
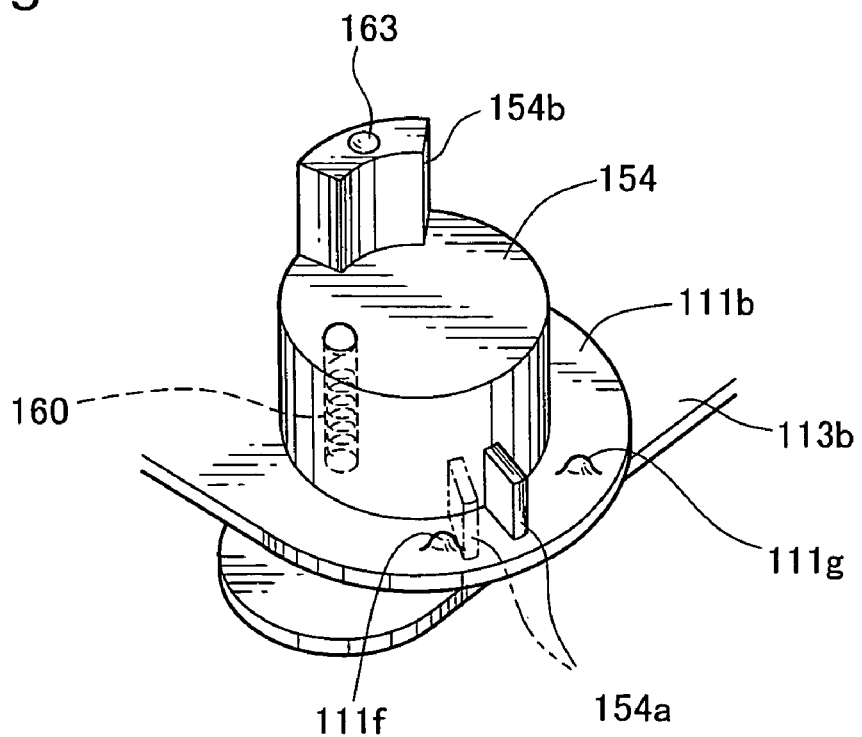
FIG. 11 is a schematic diagram illustrating an exemplary structure for providing a feeling of limit during the rotation of the lid body 112.
Figure 12:
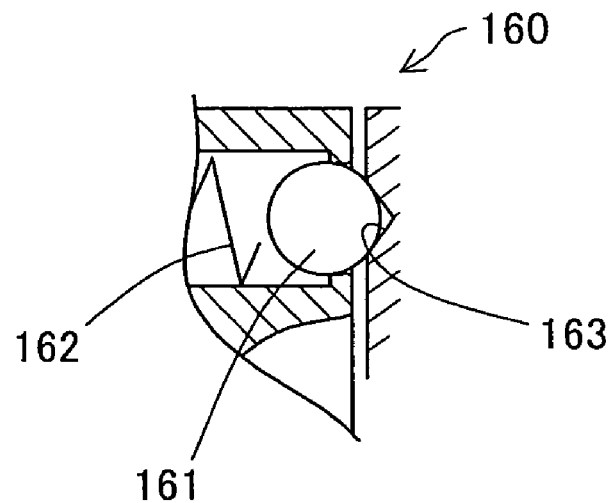
FIG. 12 is a schematic diagram illustrating the exemplary structure for providing a feeling of limit during the rotation.
Figure 13:
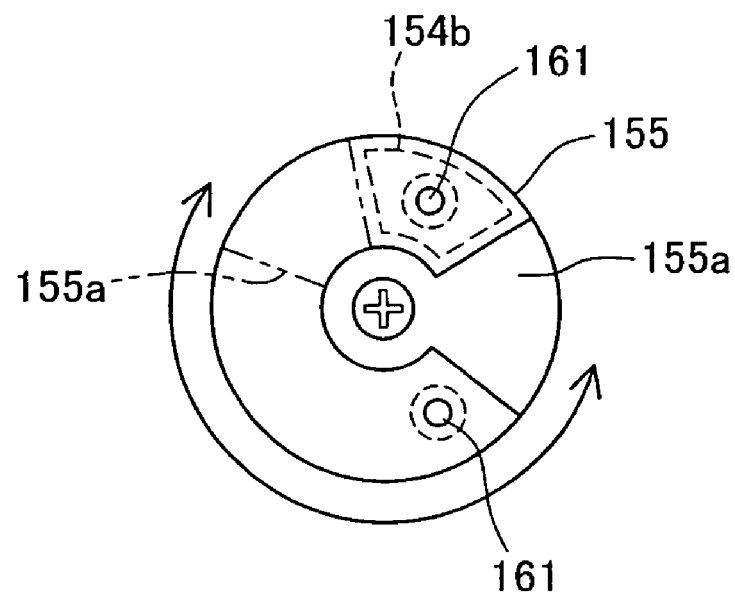
FIG. 13 is a schematic diagram illustrating the structure in the direction of arrows from the line of 13-13 shown in FIG. 10.

The main body 110, lid body 112, and imaging unit 130 are engaged by these plates etc. as described below. Drawings used for the description are as follows. FIG. 10 is a schematic diagram illustrating the main drive and holding mechanism shown on the right of FIG. 9; FIG. 11 is a schematic diagram illustrating an exemplary structure for providing a feeling of limit during the rotation of the lid body 112; FIG. 12 is a schematic diagram illustrating the exemplary structure for providing a feeling of limit during the rotation; and FIG. 13 is a schematic diagram illustrating the structure in the direction of arrows from the line of 13-13 shown in FIG. 10.

As shown in FIG. 9, the drive and holding mechanisms are respectively embedded in the bridges 111b on either side. The drive and holding mechanism on the right is a main mechanism 150 for the rotation of the main body 110 and lid body 112 and the rotation of the imaging unit 130. The drive and holding mechanism on the left is a sub mechanism 170 that has the function of arranging signal and power wires etc from the imaging unit 130 and that plays a supplementary role for the above rotation on the left side.

The main mechanism 150 includes a lid body rotatable support member 151, resin washers 152, a sleeve 153, a lid body limit member 154, an imaging unit rotatable support member 155, a resin washer 156, and a rotatable base 157 in this order from the side of the holding piece 113b. The lid body rotatable support member 151, resin washers 152, sleeve 153, and lid body limit member 154 are involved in the engagement between the main body 110 and the lid body 112. The imaging unit rotatable support member 155, resin washer 156, and rotatable base 157 are involved in the engagement between the main body 110 and the imaging unit 130.

The sub mechanism 170 includes a fixing disk 171, a resin washer 172, a sleeve 173, a lid body rotatable support body 174, and an imaging unit rotatable support dual-shaft sleeve 175 in this order from the side of the holding piece 113b. The fixing disk 171, resin washer 172, sleeve 173, and lid body rotatable support body 174 are involved in the engagement between the main body 110 and the lid body 112. The imaging unit rotatable support dual-shaft sleeve 175 is involved in the engagement between the main body 110 and the imaging unit 130.

With regard to both the drive and holding mechanisms, first the engagement between the main body 110 and the lid body 112 is described below.

The lid body rotatable support member 151 of the main mechanism 150 inserts its shaft 151a into an engagement hole 113e, and receives engagement claws 113f of the engagement hole 113e into slits 151b on the outer circumference of the shaft. Consequently, the lid body rotatable support member 151 is integrated with the holding piece 113b and thus the lid body 112, and the shaft 151a serves as the rotational axis of the lid body 112. The resin washers 152 are located on the outside of the holding piece 113b.

The sleeve 153 is attached to the shaft 151a that protrudes through the engagement hole 113e, and the shaft 151a passes through an engagement hole 111d of the bridge 111b into the inside of the bridge 111b. The lid body limit member 154 is screwed to the lid body rotatable support member 151 with the end of the shaft 151a inserted into a bottomed hole on the upper surface of the lid body limit member 154. Due to this structure, the lid body 112 having the holding piece 113b allows the shaft 151a of the lid body rotatable support member 151 to be rotatable in the engagement hole 111d of the bridge 111b relative to the main body 110 having the bridge 111b. Consequently, the main mechanism 150 enables the lid body 112 to be rotatably engaged with the main body 110 on one end of the lid body 112.

The sub mechanism 170 located on the other side of the lid body 112 is described below. The lid body rotatable support body 174 inserts its shaft 174a from the inside of the bridge 111b of the main body 110 into an engagement hole 111e of the bridge 111b, and the shaft 174a is rotatable in the engagement a hole 111e. Furthermore, the lid body rotatable support body 174 inserts the shaft 174a via the sleeve 173 into the engagement hole 113e of the holding piece 113b of the lid body 112, and is screwed via the resin washer 172 to the fixing disk 171. The shaft 174a also has the same slits as the shaft 151a of the lid body rotatable support member 151, and therefore receives the engagement claws 113f into the slits to be integrated with the holding piece 113b and thus the lid body 112. Consequently, the main mechanism 150 and the sub mechanism 170 enable the lid body 112 to be rotatably engaged with the main body 110 on both sides of the upper end of the lid body 112.

The following describes the engagement of the imaging unit 130. In the main mechanism 150, a shaft 157a of the rotatable base 157 screwed to the bridge 131a of the imaging unit 130 is inserted into the engagement hole 111e of the bridge 111b. Then, the rotatable base 157 is screwed via the resin washer 156 to the imaging unit rotatable support member 155 at its center from the side of the imaging unit rotatable support member 155 with the shaft 157a inserted into a bottomed hole of the imaging unit rotatable support member 155 located inside the bridge 111b. Due to this structure, the imaging unit 130 having the bridge 131a allows the shaft 157a of the rotatable base 157 to be rotatable in the engagement hole 111e of the bridge 111b relative to the main body 110 having the bridge 111b. Consequently, the main mechanism 150 enables the imaging unit 130 to be rotatably engaged to the main body 110 on one end of the imaging unit 130.

The imaging unit rotatable support member 155 has a fan-shaped projection 155a on the end face toward the lid body limit member 154 so that the projection 155a does not interfere with the lid body limit member 154. The details will be described later.

In the sub mechanism 170, the imaging unit rotatable support dual-shaft sleeve 175 is located between the bridge 131a of the imaging unit 130 and the bridge 111b of the main body 110. The imaging unit rotatable support dual-shaft sleeve 175 inserts a shaft 175b into an engagement hole 131c of the bridge 131a so that the shaft 175b does not rotate due to a key 175a, and inserts a shaft 175c into the engagement hole 111d of the bridge 111b so that the shaft 175c is rotatable. Consequently, the main mechanism 150 and the sub mechanism 170 enable the imaging unit 130 to be rotatably engaged on its both sides with the main body 110 between the left and right bridges 111b of the main body 110.

In this manner, the left and right engagements of the imaging unit 130 are independent from the engagement of the lid body 112 to the main body 110 so as to prevent interference of members. Therefore, this embodiment enables the direction of the imaging unit 130 to be changed as shown in FIGS. 3 and 4 irrespective of the attitude of the lid body 112.

The imaging unit rotatable support dual-shaft sleeve 175 of the sub mechanism 170 has a through-hole as a hole for arranging signal and power wires from the imaging unit 130. Consequently, the wiring is not affected even if the imaging unit 130 rotates as described above.

The following describes rotational limit of the lid body 112 and imaging unit 130. In this embodiment, an opening angle between the main body 110 and the lid body 112 is about 60° because of the stability of the lid body 112 supporting the main body and the stability of the entire apparatus in the case of the web camera attitude of FIG. 4 as well as the object imaging attitude of FIG. 3. As a result, the main body 110 and the lid body 112 make a substantial equilateral triangle along with the desktop when the imaging apparatus 100 is located on the desktop, and thereby improving the stability.

In order to keep this open state of the lid body 112, the main mechanism 150 includes two bumps on the bridge 111b to limit the open state of the lid body 112 and to give the user a feeling of limit when the attitude of the lid body 112 is changed between the closed state and open state. This is achieved by the structure described below.

As shown in FIG. 11, the bridge 111b has the bumps 111f and 111g inside. These bumps are formed on the bridge 111b by use of the so-called half punching. The lid body limit member 154 that is located inside the bridge 111b and that is engaged to the holding piece 113b as described above includes a projection 154a on its outer wall. Consequently, the lid body limit member 154 and thus the lid body 112 having the holding piece 113b rotate around the bridge 111b relative to the main body 110 within a range to which the movement of the projection 154a is limited by the bumps 111f and 111g of the bridge 111b. In this embodiment, this range is about 60° as described above.

The lid body limit member 154 also includes a limit feeling mechanism 160 for giving the user a feeling of limit when the projection 154a comes into contact with the bump 111f or 111g. As shown in FIG. 12, the limit feeling mechanism 160 pushes a rigid sphere 161 by use of a spring 162, and fits the rigid sphere 161 into a recess 163 provided on an opposing member (the bridge 111*b* in this case) to give a feeling of limit. The limit feeling mechanism 160 has the two recesses 163 shown in FIG. 12 on the bridge 111*b* in order to give a feeling of limit when the lid body 112 is rotated between the closed state and the open state, that is, when the lid body 112 is closed or opened to bring the imaging apparatus 100 into the object imaging attitude and the web camera attitude. The locations of these recesses, which are not illustrated, are such that the rigid sphere 161 of the limit feeling mechanism 160 included in the lid body limit member 154 fits into one of the recesses when the projection 154*a* comes into contact with the bump 111*f* or 111*g*.

The following describes the structure of the imaging unit 130. The imaging unit rotatable support member 155 is embedded in the bridge 111*b* and projects a projection 155*a* toward the lid body limit member 154. The lid body limit member 154 also has a projection 154*b* toward the imaging unit rotatable support member 155. Consequently, the main mechanism 150 and sub mechanism 170 enables the imaging unit 130 to rotate within a range where the projection 155*a* of the imaging unit rotatable support member 155 does not interfere with the projection 154*b* of the lid body limit member 154. In this embodiment, the above projections are formed so that the interference with each other does not prevent the imaging unit 130 from taking the object imaging attitude of FIG. 3 and the web camera attitude of FIG. 4.

Since the imaging unit 130 is directed toward the object on the straddle region MR or upward in front of the main body, the imaging unit rotatable support member 155 has the limit feeling mechanism 160 described above as shown in FIG. 10 in order to ensure the repeatability of the direction of the imaging unit 130. In this case, the recess 163 into which the rigid sphere 161 fits is formed on the end face of the projection 154*b*.

Even if the direction of the imaging unit 130 is changed, the lid body 112 remains in the same position relative to the main body 110. That is, the imaging unit rotatable support member 155 rotates along with the imaging unit 130 while the lid body limit member 154 remains still. In this manner, the imaging unit rotatable support member 155 rotates relative to the lid body limit member 154 when the direction of the imaging unit 130 is changed, and therefore the imaging unit rotatable support member 155 has rigid spheres 161 at two locations as shown in FIG. 13. The two locations in which the rigid spheres 161 are embedded correspond to the position where the imaging unit 130 is directed toward the object on the straddle region MR and the position where the imaging unit 130 is directed upward in front of the main body. One of the rigid spheres 161 fitting into the recess 163 of the projection 154*b* enables the user to perceive through a feeling of limit that the imaging unit 130 has come into the respective position describe above.

Figure 14:
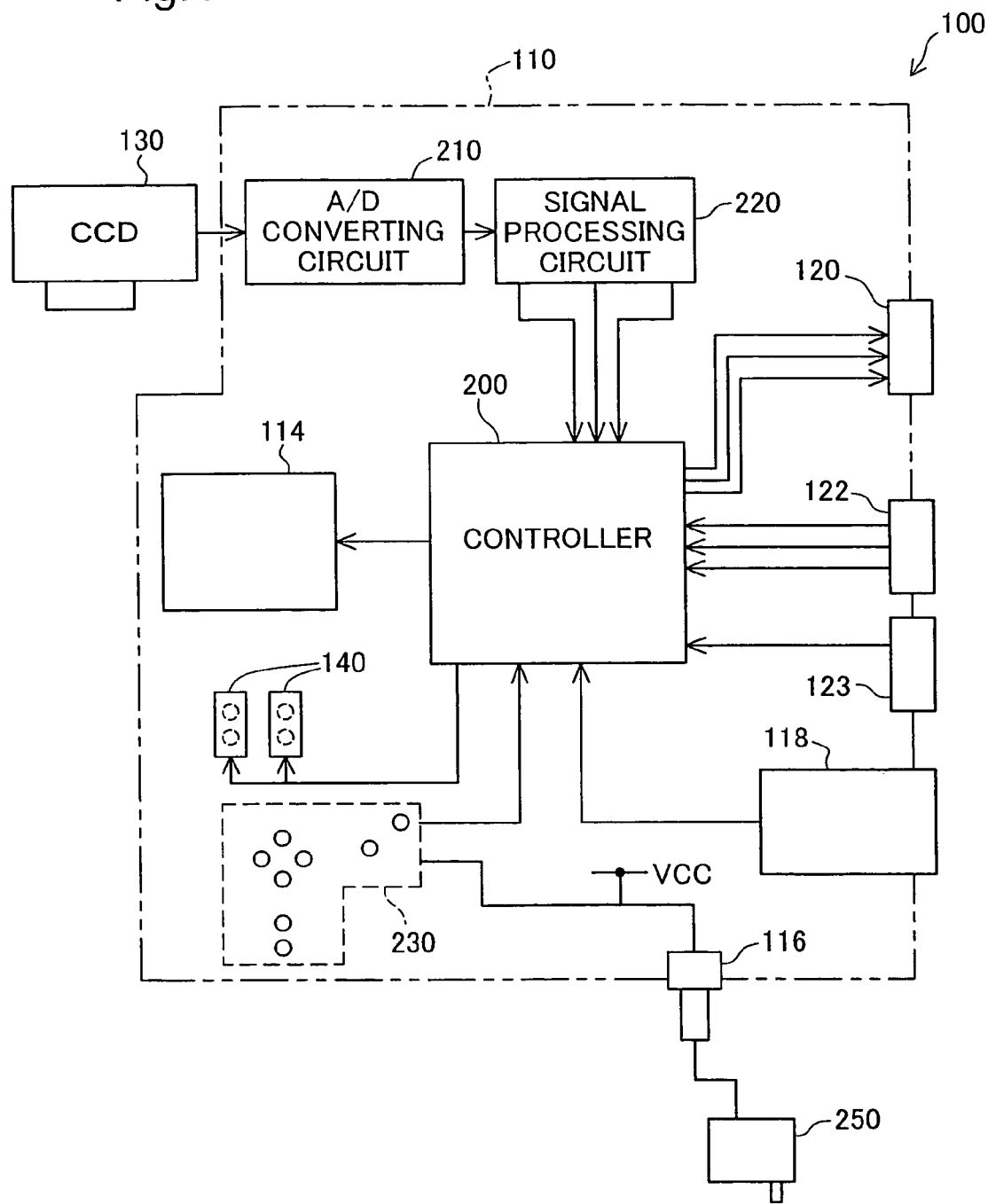
FIG. 14 is a block diagram illustrating the electrical configuration of the imaging apparatus 100.

The following describes an electrical configuration of the imaging apparatus 100 according to this embodiment. FIG. 14 is a block diagram illustrating the electrical configuration of the imaging apparatus 100. As shown in FIG. 14, the imaging apparatus 100 includes within the main body 110 at least part of electronics devices that are used to generate image signal for displaying an image acquired from the imaging unit 130 on the liquid crystal display panel 114 or external display device. The imaging apparatus 100 also includes a controller 200 to perform a variety of signal processing. The controller 200 may be configured as an arithmetic and logic circuit where a CPU, ROM, RAM, and input/output port are mutually connected through buses, or configured as a circuit that uses a variety of electronic devices.

The controller 200 receives the signal as RGB signal that is acquired by the CCD imaging device of the imaging unit 130 and then passes through an A/D conversion circuit 210 (analogue-digital conversion circuit) and a signal processing circuit 220, and changes the output destination of the signal according to the state of a set of switches 230 provided on the surface of the main body 110. Specifically, the controller 200 changes the display mode of the image acquired by the imaging unit 130 according to the operation of the switches.

In a first display mode, the image from the imaging unit 130 is selectively displayed on the liquid crystal display panel 114 included in the main body 110 or external display device. If this mode is selected through the switch operation, the controller 200 outputs the signal acquired by the CCD imaging device of the imaging unit 130 to the display device selected. If the liquid crystal display panel 114 is selected, the controller 200 outputs the image signal to the liquid crystal display panel 114 and then displays the image on the liquid crystal display panel 114. On the other hand, if the external display device is selected, the output destination of the image signal is changed so that the signal is output via the output connector 120 to the external display device. This configuration enables the imaging apparatus 100 to selectively display the image from the imaging unit 130 on the liquid crystal display panel 114 included in the main body 110 or on the external display. According to the state of switch operation, a sound signal collected by the sound collecting microphone 123 may be output along with the image signal via the output connector 120 to the external.

In a second display mode, the image from the imaging unit 130 is displayed on the liquid crystal display panel 114 included in the main body 110 and on the external display device. If this mode is selected through the switch operation, the controller 200 outputs the signal to the liquid crystal display panel 114 and via the output connector 120 to the external display device. This configuration enables the image from the imaging unit 130 to be displayed both on the liquid crystal display panel 114 and on the external display device.

In a third display mode, an image to be displayed is selected. Specifically, the controller 200 selects one from the group of image signal from the imaging unit 130, image signal from the video input terminal 122 for inputting image signals from external image device such as video camera and personal computer, and image signal from the slot 118 for inputting image signals stored on the memory, and then outputs the selected image signal to the liquid crystal display panel 114 and/or external display device. This configuration enables the image from the imaging unit 130, image from an external imaging device, or image stored on the memory to be displayed on the liquid crystal display panel 114 and/or on the external display device.

The imaging apparatus 100 also includes therein a power supply line that is arranged to supply electric power Vcc, which is supplied via the power supply connector 116 from the power supply unit 250, via a power supply switch included in the set of switches 230. Therefore, the imaging apparatus 100 does not operate unless the power supply switch is tuned on even if the power supply unit 250 is connected to the power supply connector 116. Once the power supply switch is turned on, the controller 200 may perform the image signal output to the liquid crystal display panel 114 or via the output connector 120 to the external display device as described above. Turning on a lamp switch included in the set of switches 230 causes the illumination units 140 to light up.

Although the electronics devices such as the controller 200 described above are included in the main body 110, some of them may be included in the lid body 112. For example, the A/D conversion circuit 210 and signal processing circuit 220 relating to the image signal input may be included in the lid body 112.

The imaging apparatus 100 of this embodiment that has the configuration described above includes the main body 110 and the lid body 112 that serves as a leg for supporting the main body 110, and further includes within the main body 110 the electronics devices such as the controller 200 used to generate the image signal of the image taken by the imaging unit 130. The lid body 112 is rotatably engaged with one end of the main body 110 through the main mechanism 150 and sub mechanism 170, and may take the first attitude where the lid body 112 overlaps the main body 110 as shown in FIG. 1 and the second attitude where the lid body 112 and the main body 110 make a V-shape with one end of the lid body 112 separated from the main body 110. The lid body 112 in the second attitude supports the main body 110 that is inclined from the top surface of the object supporting base such as desktop to form the straddle region MR where the main body 110 and lid body 112 straddle the object on the desktop. The imaging apparatus 100 may direct its imaging unit 130 toward the object H with straddling the object H located on the straddle region MR.

According to the imaging apparatus 100, in order to image the object H on the straddle region MR, it is only required to make the main body 110 and lid body 112 a V-shape and incline the main body 110 relative to the top surface of the object supporting base as described above without lifting up the main body 110 from the object supporting base. Consequently, the imaging apparatus 100 according to this embodiment prevents the center of gravity of the apparatus from being carelessly elevated when imaging the object as described above, and therefore has good stability during imaging the object. Furthermore, in order to image the object by use of the imaging apparatus 100, it is only required to bring the lid body 112 attached to the main body 110 into the second attitude so that the lid body 112 supports the main body 110 inclined, that is, to open the lid body 112, and therefore ensuring easy operation and handling.

The imaging apparatus 100 takes the first or second attitude described above by closing or opening the lid body 112. In doing so, the projection 154a of the lid body limit member 154 interferes with the bump 111f or 111g of the bridge 111b, so that the lid body 112 is settled into the first or second attitude. This improves the repeatability when opening the lid body 112 into the second attitude and then bringing the imaging apparatus 100 into the object imaging attitude illustrated by the solid line in FIGS. 3 and 5, and thereby keeping a distance between the object H on the straddle region MR and the imaging unit 130 toward the object H. Therefore, the imaging unit 130 may be a fixed-focus one. This preferably enables the apparatus to be simplified and thus reduced in size and weight, and thereby improving the portability of the apparatus.

In addition, the imaging apparatus 100 includes the limit feeling mechanism 160 in the lid body limit member 154, so that the user is given a feeling of limit when bringing the lid body 112 from the first attitude to the second attitude. The user can preferably perceive through this feeling of limit that the lid body 112 has come into the second attitude, that is, the imaging apparatus 100 has properly taken the object imaging attitude.

Furthermore, the imaging unit 130 is rotatable relative to the main body 110, so that the imaging apparatus may take the object imaging attitude where the imaging unit 130 is directed toward the object H on the straddle region MR and the web camera attitude where the imaging unit 130 is directed upward in front of the main body in the case of the lid body 112 taking the second attitude described above. Consequently, the imaging apparatus 100 of this embodiment improves the flexibility of imaging performed by the imaging unit 130, and thereby providing a variety of applications.

The imaging apparatus 100 of this embodiment includes the liquid crystal display panel 114 and the sound collecting microphone 123 in the main body 110, and preferably enabling the image taken by the imaging unit 130 to be viewed on the main body side, and the sound to be output along with the image to the external.

In addition, the image may be selectively displayed on the liquid crystal display panel 114 or on the external display device, or may be displayed both on the liquid crystal display panel 114 and on the external display device. Furthermore, the main body 110 includes the video input terminal 122 and the slot 118, and thereby enabling the image from a digital camera or memory to be directly displayed on the liquid crystal display panel 114 or to be displayed on the external display device through the imaging apparatus 100. Consequently, the imaging apparatus 100 provides various ways of displaying images.

In addition, the illumination units 140 are embedded in the slopes 110d of the prominent portions 110c on either side of the imaging unit 130, and thereby effectively avoiding shortage in amount of light during imaging the object H on the straddle region MR.

Figure 15:
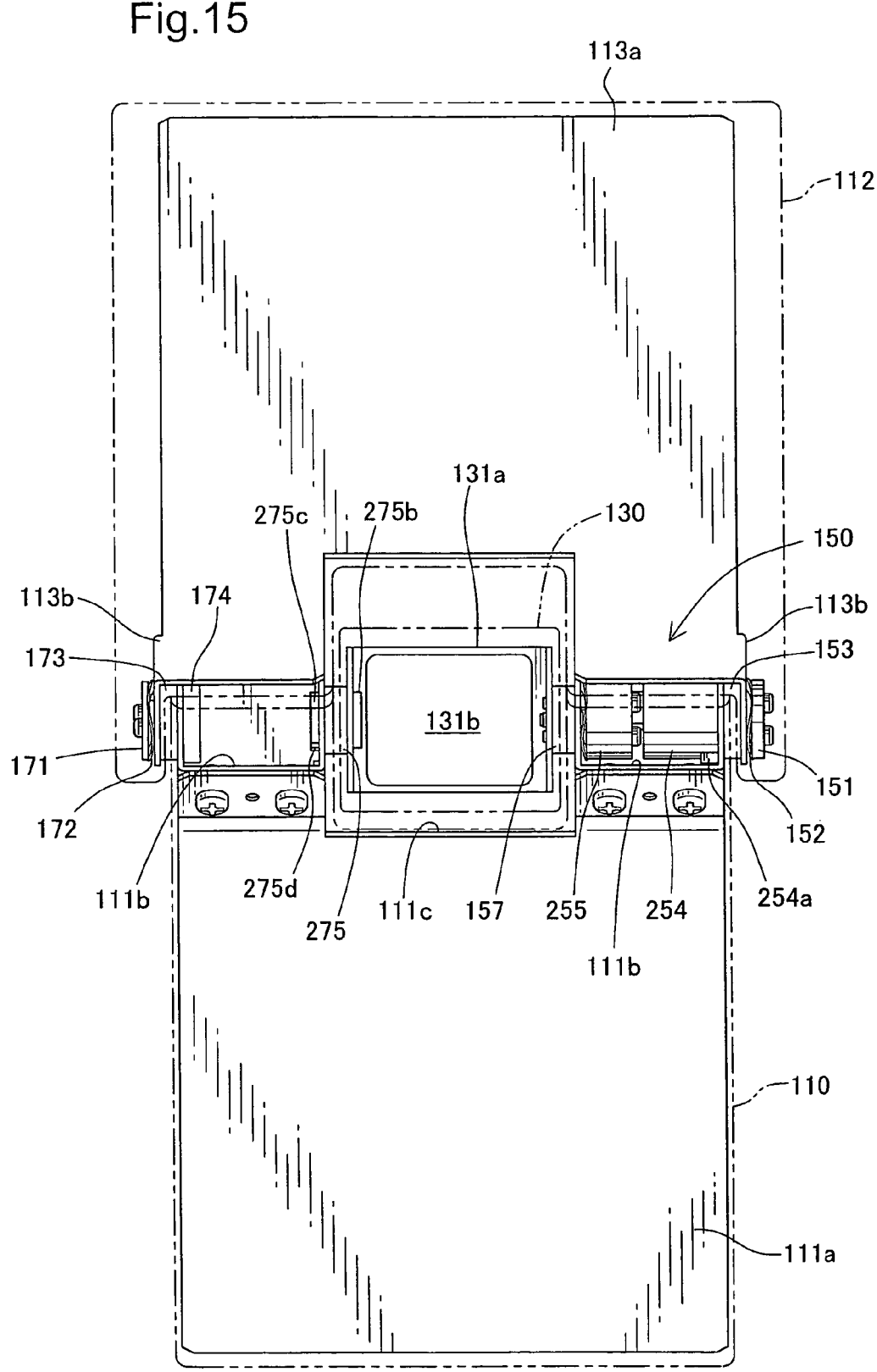
FIG. 15 is a schematic diagram of a second embodiment corresponding to FIG. 8 and illustrating a top perspective view of a drive and holding mechanism in the case of taking an object imaging attitude.
Figure 16:
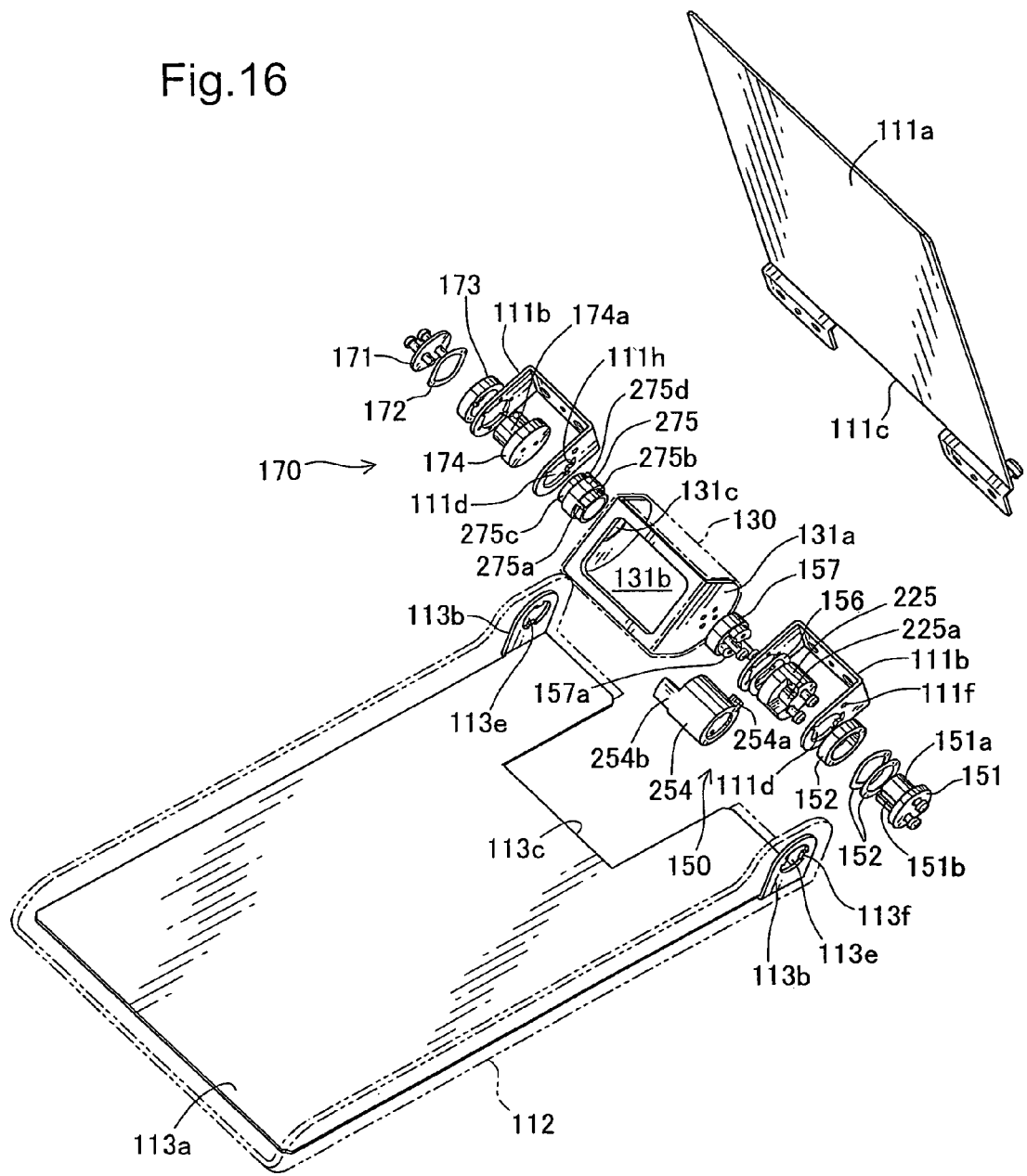
FIG. 16 is a schematic diagram of the second embodiment corresponding to FIG. 9 and illustrating an exploded view of the drive and holding mechanism.

The following describes another embodiment. A second embodiment is characterized in that the imaging unit 130 is driven to rotate in conjunction with the opening and closing of the lid body 112. FIG. 15 is a schematic diagram of the second embodiment corresponding to FIG. 8 and illustrating a top perspective view of a drive and holding mechanism in the case of taking the object imaging attitude; and FIG. 16 is a schematic diagram of the second embodiment corresponding to FIG. 9 and illustrating an exploded view of the drive and holding mechanism. In the following description, only structures different from those of the first embodiment are described in detail.

Figure 17:
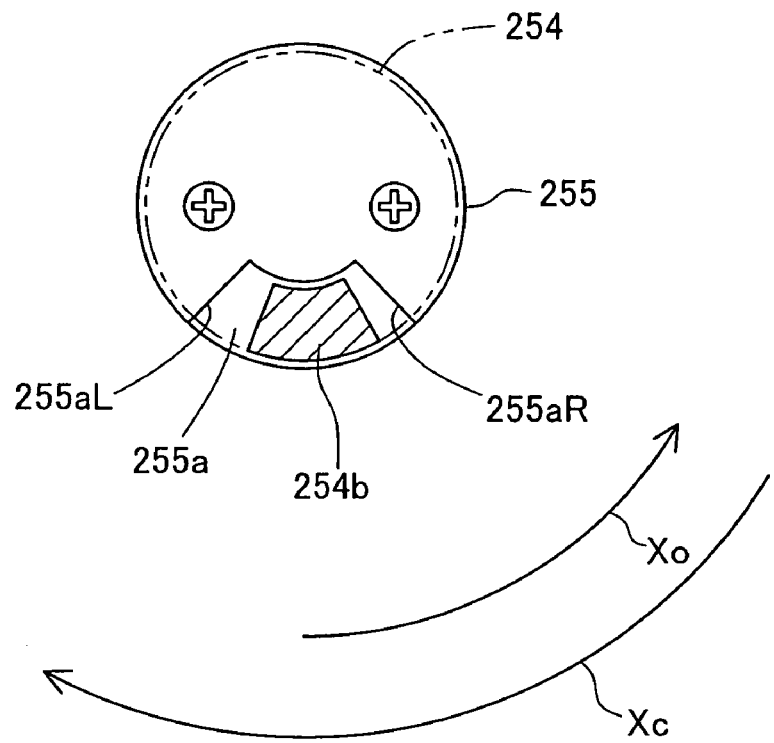
FIG. 17 is a schematic diagram illustrating the relationship between a lid body limit member 254 and an imaging unit rotatable support member 255 along with the movement of the imaging unit 130.

Since the second embodiment has the above characteristics, it has different structures of lid body limit member and imaging unit rotatable support member of the main mechanism 150 and imaging unit rotatable support dual-shaft sleeve of the sub mechanism 170. In the second embodiment, a lid body limit member 254 of the main mechanism 150 is similar to the lid body limit member 154 in that having the projection 154a (254a) for limiting the movement of the lid body 112, but the lid body limit member 254 similar to the lid body limit member 154 is also used to rotate the imaging unit 130. FIG. 17 is a schematic diagram illustrating the relationship between the lid body limit member 254 and an imaging unit rotatable support member 255 along with the movement of the imaging unit 130.

As shown in FIG. 17, the lid body limit member 254 has a projection 254b that projects toward the imaging unit rotatable support member 255, which is inserted into a fan-shaped caving 255a of the imaging unit rotatable support member 255 with play to left and right wall (left wall 255aL and right wall 255aR). The lid body limit member 254 rotates in conjunction to the rotation (opening and closing) of the lid body 112 in the same way as the lid body limit member 154. Now, it is assumed that the lid body 112 is closed (in the first attitude) as shown in FIG. 1 and then rotated to be opened. This rotation causes the lid body limit member 254 to rotate in the direction of the arrow Xo shown in FIG. 17, and therefore the lid body limit member 254 rotates alone within the play of the projection 254b in the caving 255a. That is, only the lid body 112 rotates (or opens) in the range of the play.

However, once the projection 254b comes into contact with the right wall 255aR, the lid body limit member 254 pushes the projection 254b against the right wall 255aR to rotate the imaging unit rotatable support member 255 together in the direction of the arrow Xo. This causes the imaging unit 130 to rotate from the attitude shown in FIG. 1 to the attitude shown by the solid line in FIG. 5. When the projection 254a of the lid body limit member 254 interferes with the bump 111f of the bridge 111b in the same manner as the projection 154a of the lid body limit member 154, the lid body 112 stops at the predetermined attitude (second attitude). The imaging unit 130 stops at the attitude directed toward the object H on the straddle region MR.

On the contrary, the lid body limit member 254 rotates in the direction of the arrow Xc in the case of closing the opened lid body 112. During this rotation, the lid body limit member 254 rotates alone within the play of the projection 254b against the left wall 255aL, and resulting in the lid body 112 rotating alone in the closing direction. However, once the projection 254b comes into contact with the left wall 255aL, the lid body limit member 254 pushes the projection 254b against the left wall 255aL to rotate the imaging unit rotatable support member 255 together in the direction of the arrow Xc. This causes the imaging unit 130 to rotate in the opposite direction from the attitude shown by the solid line in FIG. 5 back to the attitude shown in FIG. 1. The sub mechanism 170 described below serves as stopper during this rotation.

Figure 18:
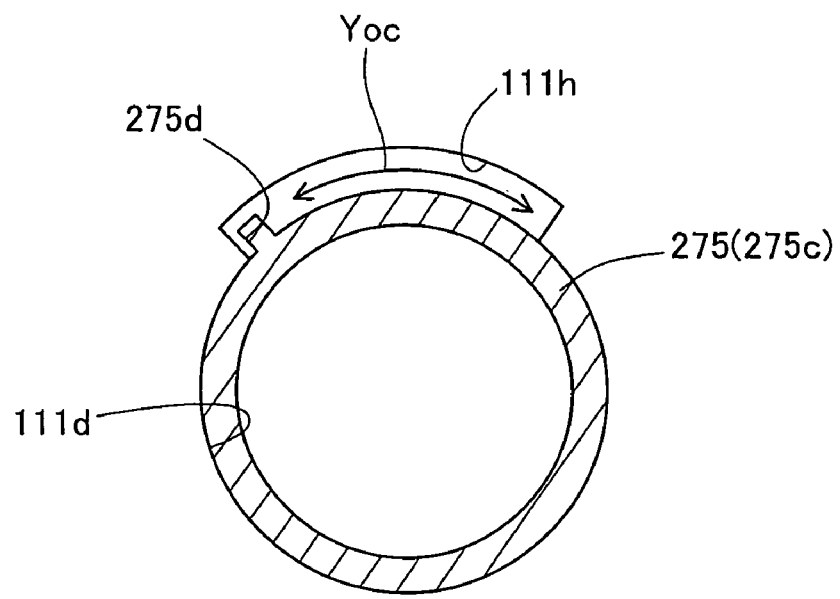
FIG. 18 is a schematic diagram illustrating the relationship between an imaging unit rotatable support dual-shaft sleeve 275 and an engagement hole 111d along with the movement of the imaging unit 130.

The imaging unit rotatable support dual-shaft sleeve 275 of the sub mechanism 170 utilizes the relationship with the engagement hole 111d of the bridge 111b to define the position to which the imaging unit 130 returns and the position to which the lid body 112 returns (i.e. first attitude), that is, to define the completion of the closing operation of the lid body 112. FIG. 18 is a schematic diagram illustrating the relationship between the imaging unit rotatable support dual-shaft sleeve 275 and the engagement hole 111d along with the movement of the imaging unit 130.

The imaging unit rotatable support dual-shaft sleeve 275 is integrated with the bridge 131a of the imaging unit 130 through a key 275a shown in FIG. 16 while inserts a shaft 275c into the engagement hole 111d of the bridge 111b on the side of the main body 110. This structure is similar to the embodiment described previously. In this embodiment, the imaging unit rotatable support dual-shaft sleeve 275 also includes a key 275d on the shaft 275c, and the key 275d is inserted into a fan-shaped cutout 111h of the engagement hole 111d.

Consequently, when the imaging unit 130 moves in conjunction with the rotation (opening and closing) of the lid body 112 as described above, the key 275d of the imaging unit rotatable support dual-shaft sleeve 275 is driven in the range of the cutout 111h as shown by the arrow Xoc of FIG. 18. When the imaging unit 130 rotates to be directed toward the object H on the straddle region MR, the main mechanism 150 defines the position of the imaging unit 130 as described previously, and therefore the key 275d has play in the cutout 111h during this rotation. However, during the imaging unit 130 rotating in conjunction with the closing rotation of the lid body 112, the imaging unit rotatable support dual-shaft sleeve 275 that rotates along with the imaging unit 130 pushes the key 275d against one end of the cutout 111h, and then preventing the imaging unit 130 from further rotating and the lid body 112 from further closing. That is, the key 275d and the cutout 111h define the returned positions of the imaging unit 130 and the lid body 112.

The second embodiment described above enables the imaging unit 130 to be rotated in conjunction with the opening movement of the lid body 112 and to be directed toward the object H on the straddle region MR at the completion of the opening of the lid body 112. That is, changing the attitude of the lid body 112 leads to setting the direction of the imaging unit 130. Therefore, when imaging the object on the straddle region MR, it is only required to open the lid body 112 into the predetermined position, and thereby facilitating the handling.

Figure 19:
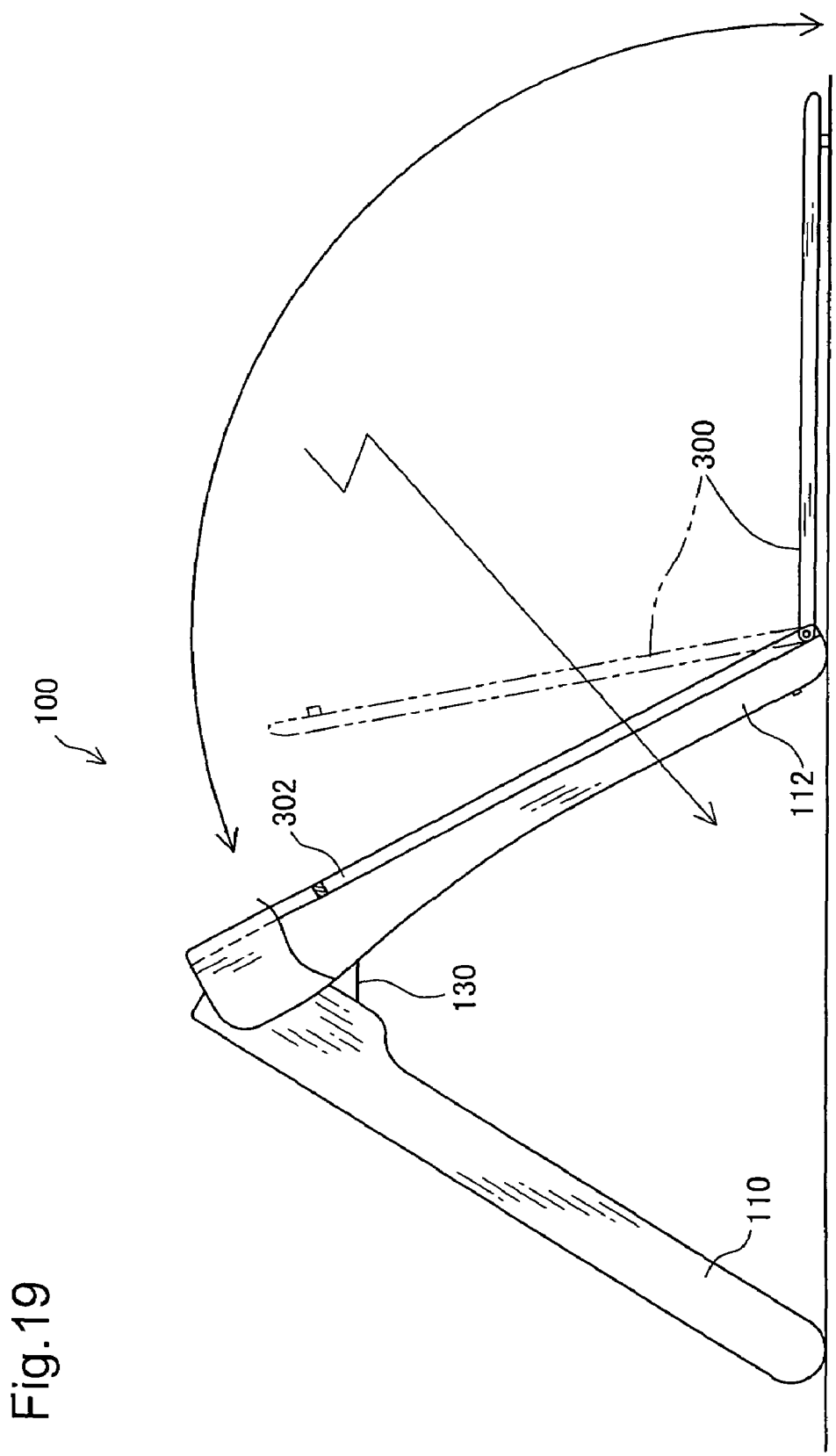
FIG. 19 is a schematic diagram illustrating a side view of an imaging apparatus 100 according to the modification.
Figure 20:
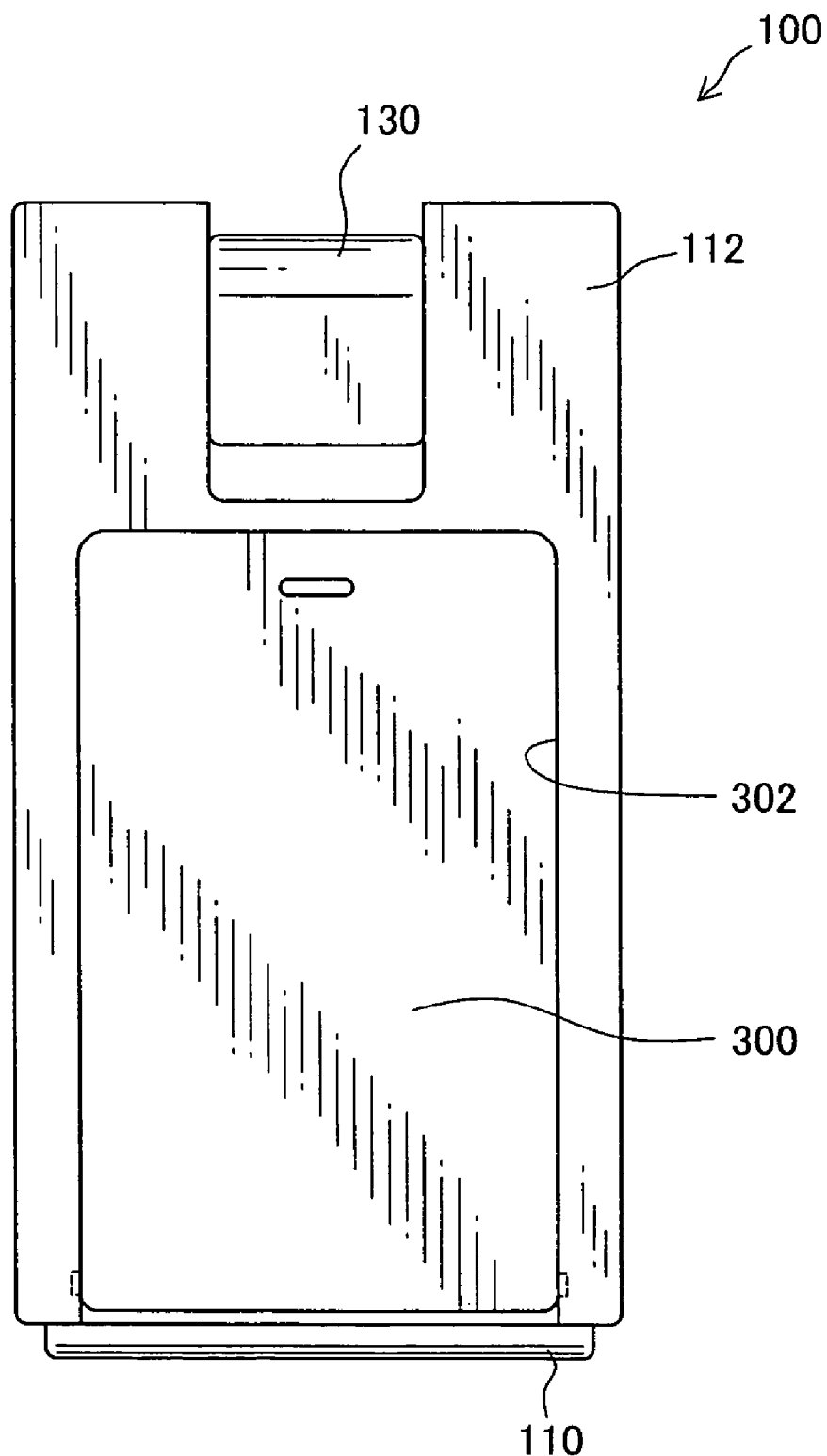
FIG. 20 is a schematic diagram illustrating the imaging apparatus 100 according the modification from the back side of the lid body 112.
Figure 21:
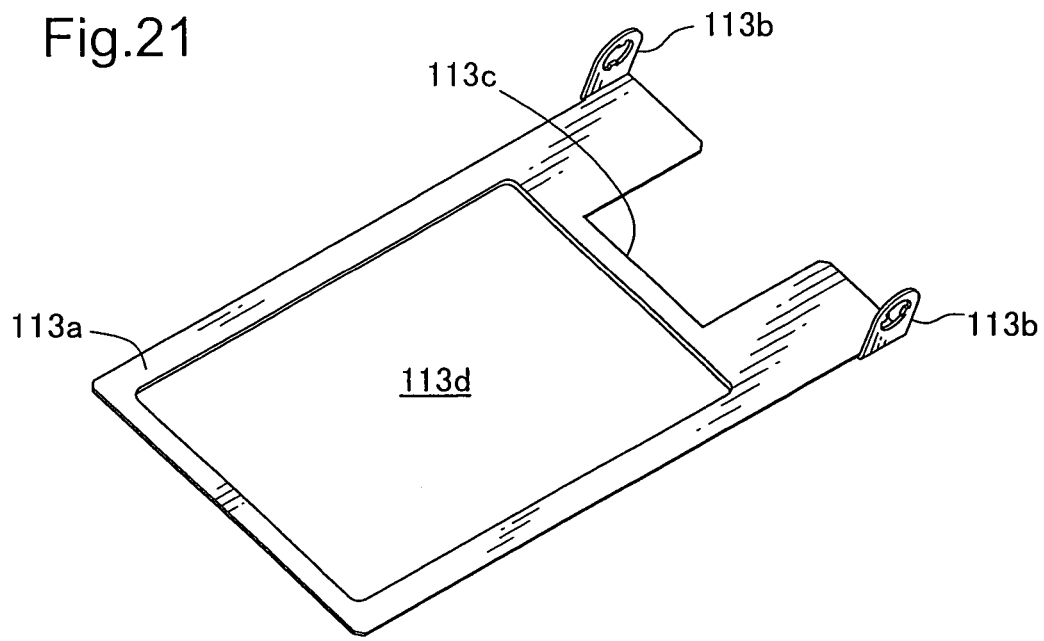
FIG. 21 is a schematic diagram illustrating a plate 113a included in the lid body 112.

The following describes a modification. FIG. 19 is a schematic diagram illustrating a side view of an imaging apparatus 100 according to the modification; FIG. 20 is a schematic diagram illustrating the imaging apparatus 100 according the modification from the back side of the lid body 112; and FIG. 21 is a schematic diagram illustrating a plate 113a included in the lid body 112.

As shown, the lid body 112 includes an opening and closing plate 300 in its back side according to the modification. The opening and closing plate 300 is rotatably engaged with a lower end of the lid body 112, and releases or covers a window 113d formed on the plate 113a. The window 113d is slightly smaller than outer shape of the opening and closing plate 300, and a rim of the window serves as a support when the opening and closing plate 300 overlaps the lid body 112.

According to this modification, the opening and closing plate 300 is opened as shown in FIG. 19 to expose the window 113d of the lid body 112. Consequently, the window 113d can let light from the outside into the straddle region MR, and preferably lowering the possibility of shortage in amount of light during imaging the object. The modification may omit the illumination units 140, and therefore has advantages of weight and cost reduction. In this case, the window 113d may include a transparent member such as obscured glass having light diffusion function due to diffused reflection, and translucency. This configuration is preferable in terms of object illumination since it leads diffused light to the object H.

Figure 22:
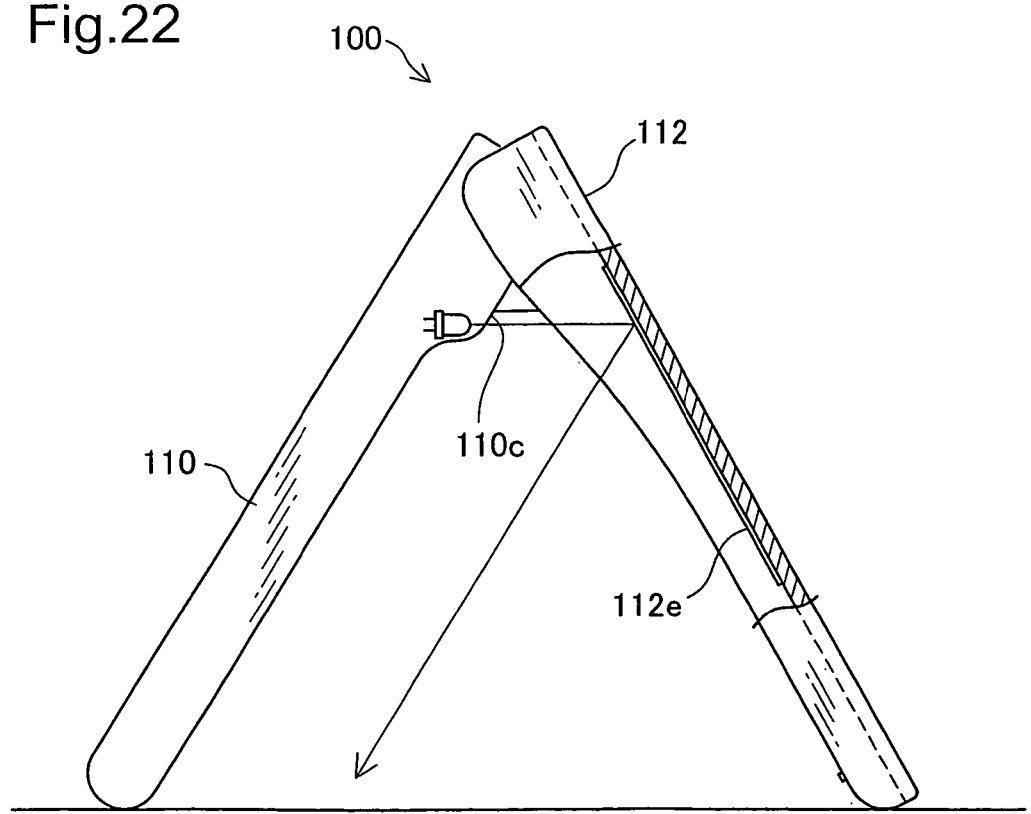
FIG. 22 is a schematic diagram illustrating another modification of imaging apparatus 100.

Although the embodiments are described above, the present invention is not limited to these embodiments and implementations but may be embodied in a variety of aspects without departing from its scope. For example, the following modification may be implemented. FIG. 22 is a schematic diagram illustrating another modification of imaging apparatus 100.

As shown in FIG. 22, in this modification a LED is included in the prominent portion 110c of the main body 110, and is directed toward the backside of the lid body 112. In addition, the backside of the lid body 112 includes a reflector plate 112e that also serves as a light diffuser. This configuration is preferable for imaging the object H since it enables the object H to be illuminated indirectly.

What is claimed is:

1. An imaging apparatus for outputting an image signal to an external display device, the imaging apparatus comprising:
   a main body including at least part of electronics devices for image signal generation, the main body comprising a display unit positioned on a front major surface thereof, the display unit operable to display, based on an image signal generated by the electronics devices, an image of an object taken by an imaging device;
   a leg attached to a first end of the main body;
   the imaging device operable to take the image of an object and located on the first end of the main body; and a leg movable mechanism that facilitates the leg to take a first attitude and to take a second attitude, in the first attitude the leg overlapping the main body on a rear side of the main body, in the second attitude the leg supporting the main body so that the main body has a second end, opposite the first end, in contact with a top surface of a supporting base for the object and inclined relative to the top surface, wherein in the second attitute: the inclined main body and the leg form a straddle region such that the inclined main body and the leg straddle the object on the top surface of the supporting base, the imaging device is directed toward the object while the main body and the leg straddle the object, and the display unit on the front major surface of the main body is viewable from an outside of the straddle region, wherein the main body comprises an imaging device holding mechanism that automatically directs the imaging device toward the object on the straddle region when the leg is brought from the first attitude to the second attitude.

2. The imaging apparatus according to claim 1, wherein the leg keeps a distance between the top surface of the supporting base for the object in the straddle region and the imaging device toward the object when the leg is brought from the first attitude to the second attitude.

3. The imaging apparatus according to claim 2, wherein the leg movable mechanism comprises a leg holding mechanism that holds the leg to the main body, wherein when a user brings the leg from the first attitude to the second attitude, the leg holding mechanism gives the user a feeling of limit at the completion of the second attitude.

4. The imaging apparatus according to one of claims 1 to 3, wherein the main body is capable of taking a first attitude where the imaging device is directed toward the object on the straddle region and a second attitude where the imaging device is directed toward a predetermined region other than the straddle region.

5. The imaging apparatus according to claim 1, wherein the leg comprises a lighting window that lets light from the outside into the straddle region.

6. The imaging apparatus according to claim 1, wherein the main body displays the image on the display unit and outputs the image signal to the external display device.

7. The imaging apparatus according to claim 1, further comprising a display selector operable to select displaying of an image on the display unit or via the output of the image signal on the external display device.

8. The imaging apparatus according to claim 1, wherein
the main body comprises an input device for inputting an image signal from an external image signal output device, and
the imaging apparatus selectively displays on the display unit an image based on the image signal from the external image signal output device or an image taken by the imaging device.

9. The imaging apparatus according to claim 1, wherein at least one of the main body and the leg has an illumination device for illuminating the area on the straddle region.

10. The imaging apparatus according to claim 1, wherein the main body comprises: a sound collecting device; and a sound output device for outputting collected sound as a sound signal to an external sound output device.

\* \* \* \* \*